US011069936B2

(12) United States Patent
Ito et al.

(10) Patent No.: US 11,069,936 B2
(45) Date of Patent: Jul. 20, 2021

(54) ELECTRIC WORK VEHICLE

(71) Applicant: Kubota Corporation, Osaka (JP)

(72) Inventors: Hirokazu Ito, Sakai (JP); Kazuo Koike, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 387 days.

(21) Appl. No.: 15/622,401

(22) Filed: Jun. 14, 2017

(65) Prior Publication Data

US 2018/0026244 A1   Jan. 25, 2018

(30) Foreign Application Priority Data

Jul. 22, 2016 (JP) .............................. JP2016-144564
Jul. 22, 2016 (JP) .............................. JP2016-144565

(51) Int. Cl.
| | | |
|---|---|---|
| *H01M 50/20* | (2021.01) | |
| *B60K 1/04* | (2019.01) | |
| *A01D 34/64* | (2006.01) | |
| *A01D 69/02* | (2006.01) | |
| *A01D 34/78* | (2006.01) | |
| *B60L 50/64* | (2019.01) | |
| *H01M 50/24* | (2021.01) | |
| *H01M 50/256* | (2021.01) | |
| *A01D 101/00* | (2006.01) | |
| *A01D 34/74* | (2006.01) | |

(52) U.S. Cl.
CPC ............ *H01M 50/20* (2021.01); *A01D 34/64* (2013.01); *A01D 34/78* (2013.01); *A01D 69/02* (2013.01); *B60K 1/04* (2013.01); *B60L 50/64* (2019.02); *H01M 50/24* (2021.01); *H01M 50/256* (2021.01); *A01D 34/74* (2013.01); *A01D 2101/00* (2013.01); *B60K 2001/0416* (2013.01); *B60K 2001/0477* (2013.01); *B60K 2001/0488* (2013.01); *B60Y 2200/223* (2013.01); *B60Y 2200/91* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,120,411 A | * | 10/1978 | Johnson ................... | B62B 3/10 |
| | | | | 104/235 |
| 8,146,694 B2 | * | 4/2012 | Hamidi .................... | B60L 50/64 |
| | | | | 180/68.5 |
| 8,653,786 B2 | * | 2/2014 | Baetica ................... | A01D 34/78 |
| | | | | 320/104 |
| 2008/0280195 A1 | | 11/2008 | Kumar et al. | |
| 2014/0102065 A1 | | 4/2014 | Moriguchi et al. | |
| 2014/0287283 A1 | | 9/2014 | Kimpara et al. | |

FOREIGN PATENT DOCUMENTS

| | | |
|---|---|---|
| JP | 271025 U | 5/1990 |
| JP | 2010527113 A | 8/2010 |
| JP | 3176417 U | 6/2012 |
| JP | 2013000115 A | 1/2013 |
| JP | 2014184824 A | 10/2014 |

* cited by examiner

*Primary Examiner* — Ladan Mohaddes
(74) *Attorney, Agent, or Firm* — The Webb Law Firm

(57) ABSTRACT

An electric work vehicle includes a battery container provided in a traveling vehicle body and including a guiding unit, and a battery pack removably attached to the battery container and including a guided unit. A pair of rollers are provided in one of the guiding unit and the guided unit, and a pair of engaging portion to be engaged with the rollers are provided in the other of the guiding unit and the guided unit. When the battery pack is loaded or unloaded onto/from the battery container at the loading/unloading position, the rollers engage with the engaging portions, thereby functioning as pivot fulcrums for enabling the battery pack to pivot for loading and unloading.

8 Claims, 14 Drawing Sheets

ELECTRIC WORK VEHICLE

CROSS-REFERENCE TO RELATED APPLICATIONS

This application claims priority to Japanese Patent Application Nos. 2016-144564 and 2016-144565, both filed Jul. 22, 2016, the disclosures of which are hereby incorporated in their entirety by reference.

BACKGROUND OF THE INVENTION

Field of the Invention

The present invention relates to an electric work vehicle that includes a battery pack and a battery container.

Description of Related Art (1) First Related Art

An example of such an electric work vehicle is disclosed in JP 2013-000115A (or US 2014/0102065A1 corresponding thereto). To removably attach a battery pack ("battery 25" in US 2014/0102065A1) to a battery container ("chassis 11" in US 2014/0102065A1), this electric work vehicle includes wheels for movement that are provided on the battery pack, a battery-side holding portion capable of rotating between a conveyance position and an attachment position, a lock mechanism for locking the holding portion at the conveyance position or the attachment position, a battery-side bracket that rotates integrally with the holding portion, a vehicle body-side bracket, a locking shaft that joins these brackets to each other in a relatively rotatable manner, right and left rollers for guiding the battery pack into the battery container, a vehicle body-side buffer portion (rubber plate and coil spring) for receiving the battery pack that has rotated into the battery container, a battery-side attachment bracket, a vehicle body-side attachment bracket, and a locking rod for joining these attachment brackets to each other and fixing the battery pack to the battery container.

With this configuration, when loading the battery pack onto the vehicle body, an operator first performs a battery pack moving operation to hold the holding portion at the conveyance position to move the battery pack to the position at which the battery pack is to be joined to the vehicle body. Next, the operator performs a holding portion displacing operation to rotate the holding portion together with the battery-side bracket from the conveyance position to the attachment position to fix the holding portion at the attachment position. Thereafter, the operator performs a battery pack joining operation to join the battery-side bracket to the vehicle body-side bracket using the locking shaft and rotatably join the battery pack to the vehicle body. After this joining operation, the operator performs a battery pack loading operation to hold the holding portion and rotate the battery pack toward the vehicle body with the locking shaft acting as a fulcrum, while guiding a back face of the battery pack using the right and left rollers. Thus, the battery pack can be loaded onto the vehicle body. Thereafter, the operator performs a battery pack fixing operation to join the battery-side attachment bracket to the vehicle body-side attachment bracket using the locking rod and fix the battery pack to the vehicle body.

Conversely, when removing the battery pack from the vehicle, the operator first performs a battery pack unfixing operation to cancel the joint between the battery-side attachment bracket and the vehicle body-side attachment bracket through the locking rod, and unfix the battery pack. Thus, the battery pack can be removed from the vehicle body. Next, the operator performs a battery pack unloading operation to hold the holding portion and rotate the battery pack to a grounding position behind the vehicle body with the locking shaft acting as a fulcrum, while guiding the rear face of the battery pack using the right and left rollers. Thereafter, the operator performs a battery pack joint canceling operation to cancel the joint between the battery-side bracket and the vehicle body-side bracket through the locking shaft, and cancel the joint between the battery pack and the vehicle body. Thereafter, the operator performs a holding portion displacing operation to rotate the holding portion together with the battery-side bracket from the attachment position to the conveyance position to fix the holding portion at the conveyance position, and then performs a battery pack moving operation to hold the holding portion at the conveyance position and move the battery pack from the position at which the battery pack is joined to the vehicle body.

That is to say, when loading the battery pack onto the vehicle body, the operator needs to perform the holding portion displacing operation and the battery pack joining operation to enable the battery pack loading operation, in addition to the battery pack moving operation and the battery pack loading operation. Also, when removing the battery pack from the vehicle, the operator needs to perform the battery pack joint canceling operation and the holding portion displacing operation to enable the battery pack moving operation, in addition to the battery pack unloading operation and the battery pack moving operation. As a result, loading and unloading of the battery pack onto/from the vehicle body take time and effort, and are therefore troublesome.

Moreover, to enable the holding portion displacing operation, a rotation shaft and a lock mechanism need to be provided. Also, to enable a battery pack loading/unloading operation, the battery-side bracket, the vehicle body-side bracket, and the locking shaft for joining these brackets to each other need to be provided. Furthermore, because the battery pack is loaded onto the vehicle through the rotating operation, the buffer portion needs to be provided on the vehicle body. As a result, more parts are required to load and unload the battery pack, making the configuration complex and increasing costs.

For the above reasons, easy loading and unloading of the battery pack onto/from the vehicle body while simplifying the configuration and reducing costs, for example, are desired.

(2) Second Related Art

The electric work vehicle disclosed in JP 2013-000115A (US 2014/0102065A1) includes a rubber plate and a coil spring, which serve as buffering portions for buffering an impact received when the rear face of the battery pack abuts against an abutting portion of the vehicle body. However, the electric work vehicle does not include a vibration-isolating member for supporting the battery pack in a vibration-isolating manner. Therefore, in a state where the battery pack is attached with a free end of the battery pack fixed to a rear portion of the vehicle body using the locking rod, vibrations that occur during travel, for example, are transmitted to the battery pack without being dampened. It is, accordingly, highly likely that the vibrations that occur during travel, for example, will adversely affect the battery pack.

Accordingly, it is desired to avoid the adverse effects caused by the vibrations that occur during travel, for example, from being exerted on the battery pack contained in the battery container.

SUMMARY OF THE INVENTION (1) Associated with the "First Related Art", an electric work vehicle is provided with an aspect as under:

An electric work vehicle comprising:
a traveling vehicle body;
a battery container provided in the traveling vehicle body;
a battery pack that is removably attached to the battery container;
a guiding unit provided in the battery container, the guiding unit being configured to guide the battery pack between a loading/unloading position at which the battery pack is loaded onto and unloaded from the battery container and a containing position at which the battery pack is contained; and
a guided unit provided in the battery pack, the guided unit being guided by the guiding unit,
wherein a pair of rollers are provided in one of the guiding unit and the guided unit,
a pair of engaging portions to be engaged with the rollers are provided in the other of the guiding unit and the guided unit, and
when the battery pack is loaded and unloaded at the loading/unloading position, the rollers function as pivot fulcrums for enabling, by engaging with the engaging portions, the battery pack to pivot for loading and unloading relative to the battery container.

With this configuration, when loading the battery pack to the containing position, an operator first performs a first moving operation to hold the handle and move the battery pack to the loading/unloading position. Next, the operator, who is holding the handle, performs an engaging operation to engage the rollers with the respective engaging portions at the loading/unloading position, and then performs a pivoting operation to load the battery pack with the rollers acting as pivot fulcrums. Thereafter, the operator performs a second moving operation to move the battery pack from the loading/unloading position to the containing position while disengaging the engaging portions from the rollers, guided by the guiding unit. Thus, the battery pack can be loaded to the containing position.

When removing the battery pack from the containing position, the operator first performs a third moving operation to engage the engaging portions with the respective rollers while moving the battery pack from the containing position to the loading/unloading position, guided by the guiding unit. Next, the operator performs, at the loading/unloading position, a pivoting operation to hold the handle and unload the battery pack with the rollers acting as pivot fulcrums. Thereafter, the operator, who is holding the handle, performs a disengaging operation to disengage the engaging portions from the rollers, and then performs a fourth moving operation to move the battery pack from the loading/unloading position. Thus, the battery pack can be removed from the containing position to the outside of the vehicle.

That is to say, as a result of the guiding unit and the guided unit being provided in addition to the right and left wheels for movement and the handle, the operator can load the battery pack to the containing position by performing the aforementioned first moving operation, engaging operation, loading pivoting operation, and second moving operation. The operator can also remove the battery pack from the containing position to the outside of the vehicle by performing the aforementioned third moving operation, unloading pivoting operation, disengaging operation, and fourth moving operation.

When the operator performs the loading pivoting operation or unloading pivoting operation, displacement of the battery pack outward of the vehicle body under its own weight can be avoided by the engagement between the rollers and the engaging portions.

Thus, when performing the loading pivoting operation or unloading pivoting operation, the operator does not need to manually stop the displacement of the battery pack outward of the vehicle body under its own weight.

As a result, loading and unloading of the battery pack onto/from the vehicle body can be facilitated while simplifying the configuration and reducing costs, for example.

In a preferred embodiment, the rollers are provided in the guiding unit, and the engaging portions are provided in the guided unit,
the guiding unit includes a pair of right and left guiding rails,
the guided unit includes right and left guided rails that span both ends of the battery pack in a front-rear direction and are guided by the guiding rails,
the engaging portions are arranged in lower faces of the guided rails on a front side thereof, and the rollers are configured to guide the lower faces of the guided rails toward a loading/unloading position side of the battery container,
the guiding rails include lower guiding portions configured to guide the lower faces of the guided rails, and upper guiding portions configured to guide upper faces of the guided rails, and
the guiding rails are arranged on a containing position side of the battery container, in a state of allowing the battery pack to pivot for loading and unloading.

With the configuration, when loading the battery pack to the containing position, the operator engages the right and left engaging portions with the pair of rollers during the aforementioned engaging operation. The operator then performs the aforementioned loading pivoting operation, and thereafter starts the aforementioned second moving operation. As the upper faces of the guided rails are guided by the respective upper guiding portions, downward pivoting of the battery pack with the rollers acting as pivot fulcrums is stopped. Thereafter, upon the second moving operation being completed, the guided rails are in a state of being received and supported on one end side thereof from below by the rollers, and received and supported on the other end side thereof from below by the lower guiding portions. Thus, the battery pack is located at the containing position in a state where its movement from the containing position is suppressed.

Upon the operator performing the aforementioned third moving operation when removing the battery pack from the containing position, the upper faces of the guided rails are guided by the upper guiding portions, and thus downward pivoting of the battery pack with the rollers acting as pivot fulcrums is stopped until the battery pack reaches the loading/unloading position. Upon the battery pack reaching the loading/unloading position, the guiding of the upper faces of the guided rails by the upper guiding portions is canceled, and downward pivoting of the battery pack is allowed. Thus, the operator can perform the aforementioned unloading pivoting operation.

That is to say, while the battery pack is moving between the loading/unloading position and the containing position, downward pivoting of the battery pack is stopped due to the effect of the upper guiding portions. Therefore, the operator no longer needs to manually stop downward pivoting of the battery pack. When the battery pack is located at the containing position, the stability of the battery pack can be ensured.

As a result, it is possible to reduce the amount of effort required by the operator when moving the battery pack between the loading/unloading position and the containing position, while ensuring the stability of the battery pack at the containing position.

In another preferred embodiment, the rollers are provided in the guiding unit, and the engaging portions are provided in the guided unit, the guided unit includes right and left guided rails that span both ends of the battery pack in a front-rear direction, and the engaging portions are steps formed in lower faces of the guided rails on a front side thereof, the guiding unit includes the rollers configured to guide the lower faces of the guided rails and a pair of second rollers configured to guide upper faces of the guided rails, the rollers are arranged on a loading/unloading position side of the battery container, and the second rollers are arranged in the battery container at a position on a containing position side relative to the roller, in a state of allowing the battery pack to pivot for loading and unloading.

With the configuration, when loading the battery pack to the containing position, the operator engages the right and left engaging portions with the pair of first rollers during the aforementioned engaging operation. The operator then performs the aforementioned loading pivoting operation, and thereafter starts the aforementioned second moving operation. Then, as the upper faces of the guided rails are guided by the respective second rollers, downward pivoting of the battery pack with the first rollers acting as pivot fulcrums is stopped. Thereafter, upon the second moving operation being completed, the battery pack is located at the containing position.

Upon the operator performing the aforementioned third moving operation when removing the battery pack from the containing position, the upper faces of the guided rails are guided by the respective second rollers, and thus, downward pivoting of the battery pack with the first rollers acting as pivot fulcrums is stopped until the battery pack reaches the loading/unloading position. Upon the battery pack reaching the loading/unloading position, the guiding of the upper faces of the guided rails by the second rollers is canceled, and downward pivoting of the battery pack is allowed. Thus, the operator can perform the aforementioned unloading pivoting operation.

That is to say, while the battery pack is moving between the loading/unloading position and the containing position, downward pivoting of the battery pack is stopped due to the effect of the second rollers. Therefore, the operator no longer needs to manually stop downward pivoting of the battery pack.

As a result, it is possible to reduce the amount of effort required by the operator when moving the battery pack between the loading/unloading position and the containing position.

In another preferred embodiment, the pivot fulcrums are located at or adjacent a centroid position of the battery pack when the battery pack pivots for loading and unloading.

The configuration can reduce the amount of effort required by the operator when performing the pivoting operation to load the battery pack or the pivoting operation to unload the battery pack at the loading/unloading position.

In another preferred embodiment, the electric work vehicle further comprises: a pair of right and left wheels arranged in a lower portion of the battery pack; and a handle arranged in a rear portion of the battery pack, wherein lower ends of the wheels are located below a bottom face of the battery pack, and rear ends of the wheels are located rearward of a rear face of the battery pack, and the handle extends upward from the rear portion of the battery pack with a top of the handle above the battery pack.

With the configuration, when the battery pack has been removed from the vehicle body and is in a state of being stored at a given storage position or charging position, for example, a front lower end of the battery pack and the right and left wheels are grounded. Thus, an inconvenient, unexpected movement of the battery pack in a stored state can be suppressed.

When performing the aforementioned first moving operation or fourth moving operation, the operator holds the handle on an upper side thereof to displace the handle to the lower rear side, and can thus readily raise the front side of the battery pack with the right and left wheels acting as fulcrums. Thus, the first moving operation and fourth moving operation, which are performed with the front side of the battery pack raised, are facilitated.

By raising the front side of the battery pack when performing the first moving operation and fourth moving operation, the operator can readily transition from the first moving operation to the aforementioned engaging operation, and transition from the aforementioned disengaging operation to the fourth moving operation.

As a result, unexpected movement of the battery pack in a stored state can be suppressed while further facilitating loading and unloading of the battery pack onto/from the vehicle body.

In another preferred embodiment, the electric work vehicle further comprises:

a handle arranged in a rear portion of the battery pack, wherein the handle includes a fixed portion fixed to the battery pack, and a movable portion capable of being displaced relative to the fixed portion, an upper end of the fixed portion is located at the same height or substantially the same height as an upper end of the battery pack, and the movable portion is supported by the fixed portion so as to be able to be displaced between a use position located above the fixed portion and a storage position located at substantially the same height as the fixed portion.

With the configuration, for example, if the operator displaces the movable portion from the storage position to the use position when performing the aforementioned loading pivoting operation or unloading pivoting operation, the extension length of the handle, which extends upward from an upper end of the battery pack, increases, and the distance from the pivot fulcrums of the battery pack to the upper end of the handle increases. With this configuration, as a result of the operator holding the handle at an upper end side thereof, the amount of effort required for the loading pivoting operation or the unloading pivoting operation can be reduced.

For example, if the operator displaces the movable portion from the storage position to the use position when performing the first moving operation or fourth moving operation with the front side of the battery pack raised, the extension length of the handle, which extends upward from the upper end of the battery pack, increases, and the distance from the right and left wheels to the upper end of the handle increases. With this configuration, as a result of the operator holding the handle at the upper end side thereof, the amount of effort required for these moving operations can be reduced.

For example, if the operator displaces the movable portion from the use position to the storage position when putting the battery pack into the battery container or when removing the battery pack from the vehicle body and storing the battery pack at a given storage position or charging position, for example, the extension length of the handle, which extends upward from the upper end of the battery pack, decreases. With this configuration, the battery pack arranging space required in the battery container or a battery pack storage place can be made smaller.

In another preferred embodiment, the battery pack includes a battery unit, a battery case in which the battery unit is contained, and a plurality of rubber cushions, and the rubber cushions support the battery unit in a vibration-isolating manner between the battery case and the battery unit.

With the configuration, the battery unit is supported in a vibration-isolating manner by the rubber cushions within the battery case. Thus, when the aforementioned first moving operation, engaging operation, loading pivoting operation, second moving operation, third moving operation, unloading pivoting operation, disengaging operation, or fourth moving operation is performed, vibrations that occur during these operations are unlikely to be transmitted to the battery unit due to the effect of the rubber cushions. When the battery pack is contained in the battery container, vibrations that occur during travel, for example, are unlikely to be transmitted to the battery unit.

That is to say, as a result of the battery unit being supported in a vibration-isolating manner within the battery case, the battery unit can be favorably isolated from vibrations regardless of whether the operations to attach or detach the battery pack are performed or the battery pack is contained in the battery container.

As a result, it is possible to avoid adverse effects caused by the vibrations that occur when the battery pack is attached or detached, and during travel, for example, from being exerted on the battery pack.

In another preferred embodiment, the plurality of rubber cushions include a plurality of first rubber cushions arranged between a bottom plate of the battery case and a bottom face of the battery unit, and a plurality of second rubber cushions arranged between a rear plate of the battery case and a rear face of the battery unit.

With the configuration, when the front side of the battery pack is raised, during the aforementioned first moving operation, fourth moving operation, loading pivoting operation, or unloading pivoting operation, for example, the battery unit can be stably supported in a vibration-isolating manner by the first rubber cushions and second rubber cushions within the battery case.

With this configuration, the battery unit can be stably supported while making it less likely for vibrations that occur during these operations to be transmitted to the battery unit.

(2) Associated with the "Second Related Art", an electric work vehicle is provided with a further aspect as under:

An electric work vehicle comprising:
a traveling vehicle body;
a battery container provided in the traveling vehicle body;
a battery pack to be contained in the battery container, wherein the battery pack includes a battery unit, a battery case in which the battery unit is contained, and a plurality of vibration-isolating members, and the vibration-isolating members support the battery unit in a vibration-isolating manner between the battery case and the battery unit.

With this configuration, when the battery pack is contained in the battery container, vibrations that occur during travel, for example, are unlikely to be transmitted to the battery unit due to the effect of the vibration-isolating members in the battery case.

As a result, it is possible to avoid adverse effects caused by the vibrations that occur during travel, for example, from being exerted on the battery pack contained in the battery container.

In addition, due to the vibration-isolating members being located within the battery case, the vibration-isolating members can be prevented from coming into contact with other members and coming off when the battery pack is put into the battery container.

In one preferred embodiment, the battery unit includes a plurality of battery modules, a management unit, and a support frame configured to support the battery modules and the management unit, and the vibration-isolating members are located between the battery case and the support frame.

The configuration can reduce the number of vibration-isolating members required for vibration-isolating support, compared with the case of individually supporting the battery modules and the management unit in a vibration-isolating manner. The battery modules and the management unit can be connected so as not to be relatively displaced with respect to each other.

As a result, the battery modules and the management unit can be favorably connected while reducing costs related to supporting the battery unit in a vibration-isolating manner, and improving the assembly.

In another preferred embodiment, the battery case includes a plurality of wheels for moving the battery pack, and a handle.

With the configuration, when the operator moves the battery case using the plurality of wheels and the handle, vibrations that occur during movement are unlikely to be transmitted to the battery unit due to the effect of the vibration-isolating members in the battery case.

That is to say, as a result of the battery unit being supported in a vibration-isolating manner within the battery case, the battery unit can be favorably isolated from vibrations regardless of whether the battery pack is contained in the battery container or the operations to move the battery pack are performed.

As a result, it is possible to avoid adverse effects caused by the vibrations that occur during travel or movement, for example, from being exerted on the battery pack.

In another preferred embodiment, the plurality of wheels include a pair of right and left wheels arranged in a lower portion at a rear end of the battery pack, the handle extends upward from a rear portion of the battery case with a top of the handle above the battery case, and the vibration-isolating members include a plurality of first vibration-isolating members arranged between a bottom plate of the battery case and a bottom face of the battery unit, and a plurality of second vibration-isolating members arranged between a rear plate of the battery case and a rear face of the battery unit.

With the configuration, when the operator moves the battery pack using the right and left wheels and the handle, the front side of the battery pack can be raised with the right and left wheels acting as fulcrums, by holding the handle on the upper side thereof to displace the handle to the lower rear side, and the battery pack can be moved with the right and left wheels. When the front side of the battery pack is raised, the battery unit is stably supported in a vibration-isolating manner by the first vibration-isolating members and second vibration-isolating members in the battery case.

As a result, the battery unit can be stably supported in a state where vibrations that occur during this movement are unlikely to be transmitted to the battery unit, while enabling the battery pack to be moved using the right and left wheels.

(3) Further features and advantages achieved thereby will be apparent from the following descriptions.

DETAILED DESCRIPTION OF EMBODIMENTS

In the following description, an electric mowing machine will be discussed as an example of an electric work vehicle. Unless explicated otherwise, an arrow "F" in FIG. 1 refers to a front side of the electric mowing machine in a front-rear (or longitudinal) direction; and an arrow "U" in FIG. 1 refers to an upper side of the electric mowing machine in a vertical direction. The arrow "F" in FIG. 2 refers to the front side of the electric mowing machine; and an arrow "R" in FIG. 2 refers to a right side of the electric mowing machine in a right-left (or lateral) direction.

Overall Configuration

Figure 1:
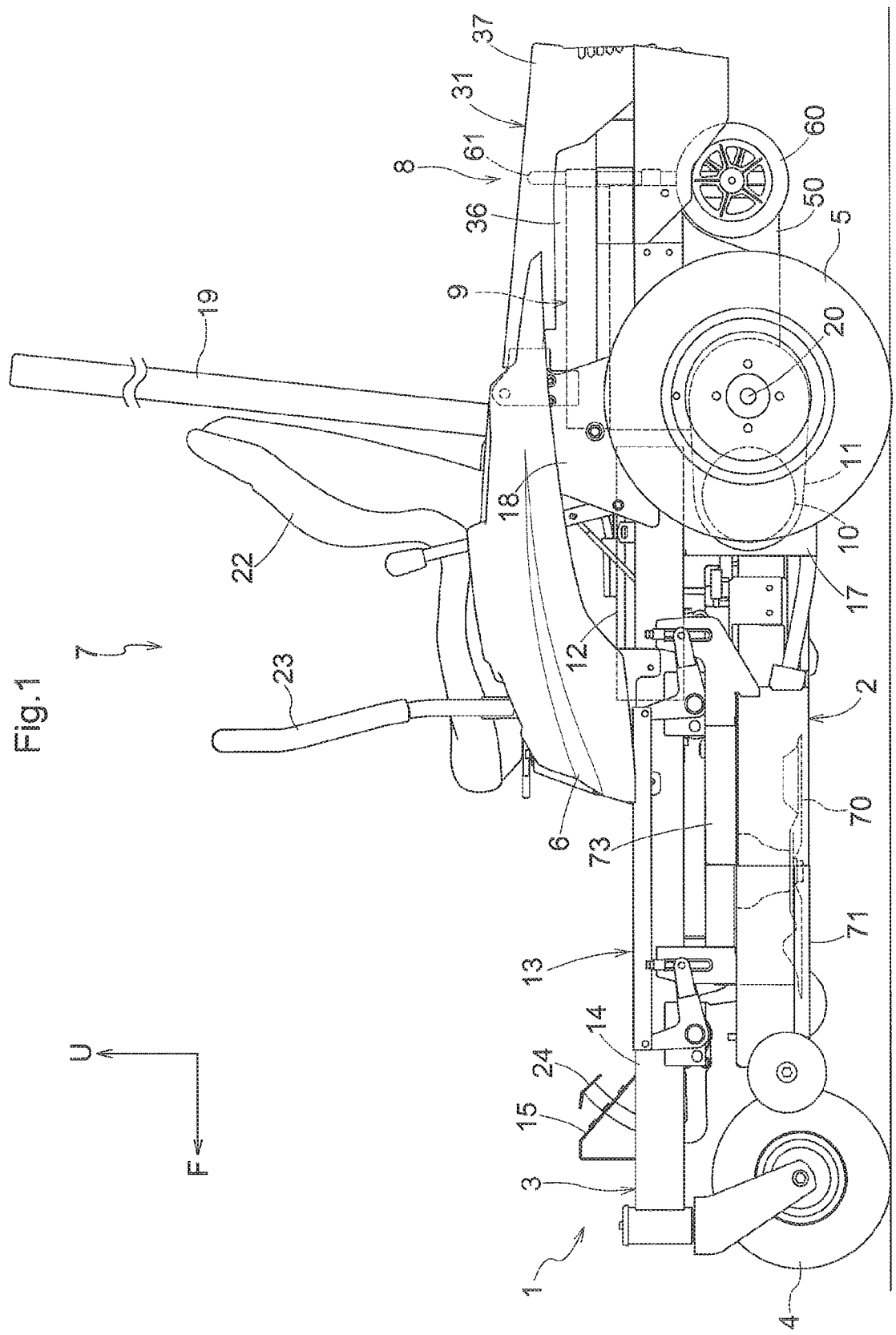
FIG. 1 is a left side view of an electric work vehicle according to one embodiment, showing an electric mowing machine as an example of such an electric work vehicle (same applies to FIGS. 2 to 14)
Figure 2:
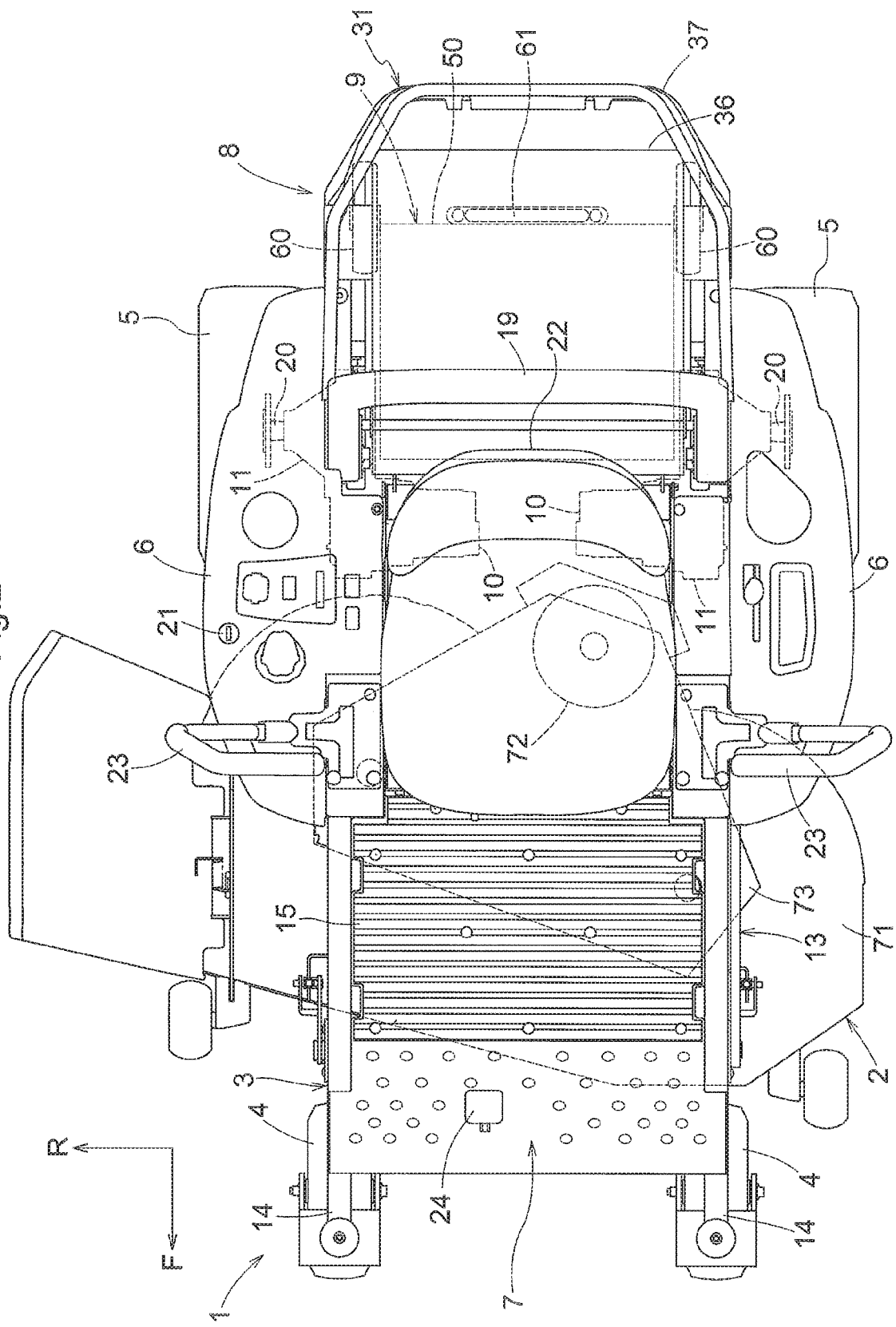
FIG. 2 is a plan view of the electric mowing machine.
Figure 3:
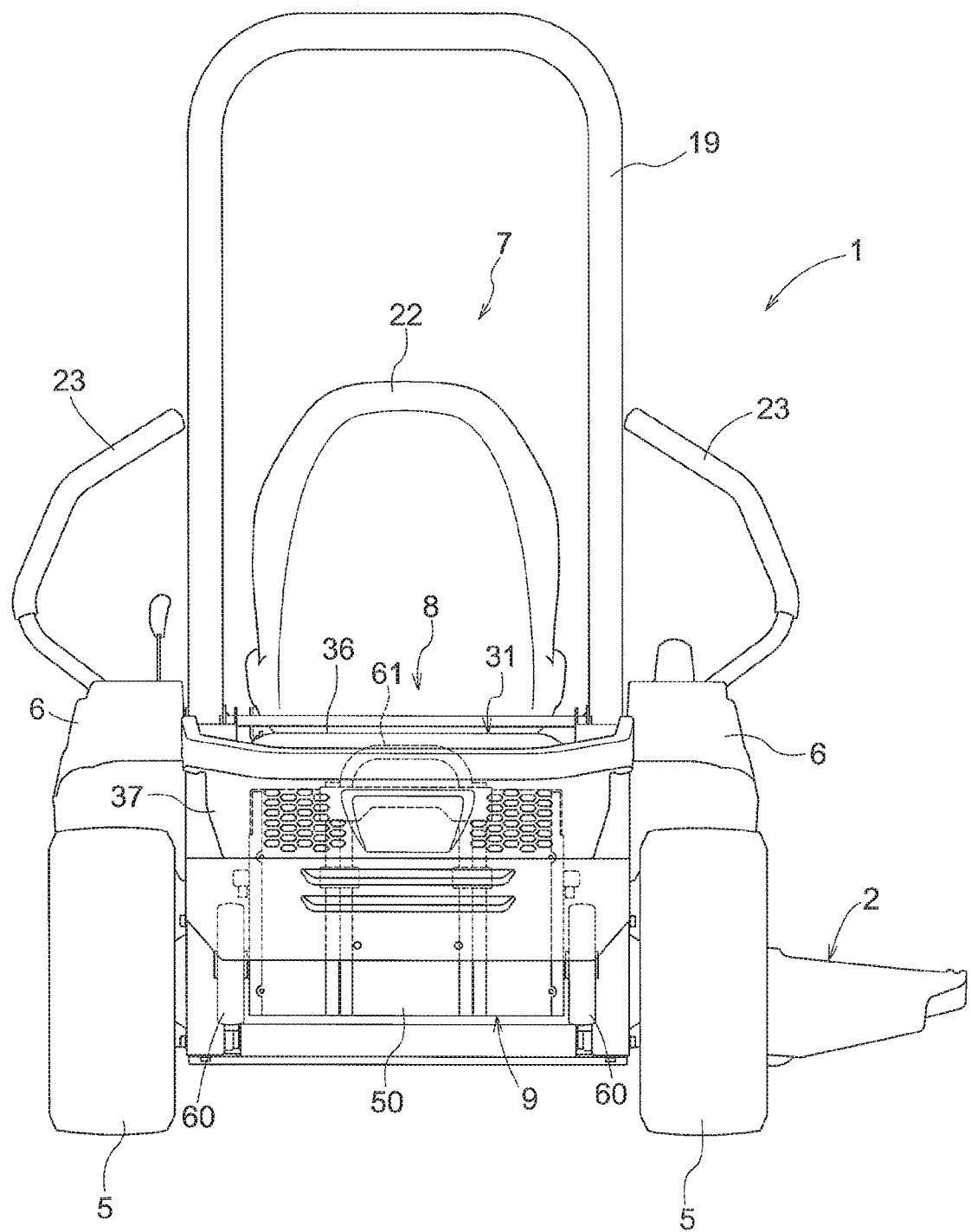
FIG. 3 is a rear view of the electric mowing machine.

As shown in FIGS. 1 to 3, the electric mowing machine described as an example in this embodiment includes a passenger-type traveling vehicle body 1, a mower unit 2, which is supported in a suspended manner at a lower middle portion of the traveling vehicle body 1 in the front-rear direction so as to be able to be raised and lowered, and so forth.

The traveling vehicle body 1 includes: a vehicle body frame 3 which forms a framework/chassis of the traveling vehicle body 1; right and left front wheels 4 of a caster type; right and left rear wheels 5 which can be individually driven at variable speeds; right and left fenders 6 which cover the right and left rear wheels 5; a driving unit 7 of a passenger type which is arranged on a front side of the traveling vehicle body 1; a battery container 8 which is arranged in a rear portion of the traveling vehicle body 1; a battery pack 9 which is removably attached to the battery container 8; right and left first electric motors 10 for traveling; right and left gear-type reduction devices 11 which decelerate the speed from the right and left first electric motors 10 and transmit the decelerated speed to the right and left rear wheels 5; an electronic control unit (hereinafter referred to as an ECU) 12 for controlling operations of the right and left first electric motors 10 and the like; a link mechanism 13 of a parallel link type, which supports the mower unit 2 in a suspending manner so as to be able to raise and lower the mower unit 2, and so forth.

As shown in FIGS. 1 to 7, the vehicle body frame 3 includes: right and left side members 14; a boarding step 15 which is provided between the right and left side members 14 on a front side thereof; a cross member 16 which is provided between the right and left side members 14 on a rear side thereof; right and left first brackets 17 which are joined to the rear side of the right and left side members 14; right and left second brackets 18 which extend upward from the rear side of the right and left side members 14; an arch-shaped protection frame 19 which is supported by the right and left second brackets 18, and so forth.

As shown in FIGS. 1 to 6, the right and left front wheels 4 are supported at a front end of the right and left side members 14 so as to be able to change their orientation. The right and left rear wheels 5 are attached to output shafts 20 of the right and left gear-type reduction devices 11 in an integrally rotatable manner. The right and left gear-type reduction devices 11 are joined to the right and left first brackets 17. The right and left first electric motors 10 are joined to input portions of the right and left gear-type reduction devices 11.

As shown in FIGS. 1 to 3, the driving unit 7 includes: a key switch 21 for intermittently supplying power from the battery pack 9 to the ECU 12 and the like; an operator seat 22 which is supported at a middle portion of the vehicle body frame 3 in the front-rear direction; right and left gear shift levers 23 which are arranged on both right and left sides of the operator seat 22; a lift pedal 24 which is arranged in a foot area of the driving unit 7, and so forth.

Each of the right and left gear shift levers 23 is of a pivoting operation type, and its operation position is inputted to the ECU 12 via a right or left lever sensor associated therewith (not shown). The ECU 12 performs travel control to control output of the right and left first electric motors 10 based on input from the right and left lever sensors. By a pivoting operation of the right and left gear shift levers 23 through this travel control, the operator can switch the travel state of the traveling vehicle body 1 to either one of: a forward straight traveling state in which the right and left rear wheels 5 are driven to rotate forward at a constant speed; a forward turning state in which the right and left rear wheels 5 are driven to rotate forward at different speeds; a reverse straight traveling state in which the right and left rear wheels 5 are driven to rotate backward at a constant speed; a reverse turning state in which the right and left rear wheels 5 are driven to rotate backward at different speeds; a pivot turning state in which one of the right and left rear wheels 5 is driven to rotate forward or backward with the other of the right and left rear wheels 5 not driven; and a spin turning state in which the right and left rear wheels 5 are driven to rotate in different directions from each other.

As shown in FIG. 1, the lift pedal 24 is linked with the link mechanism 13. Due to this linkage, the operator can raise the mower unit 2 to a retracted position on the upper side by stepping down on the lift pedal 24. The operator can also lower the mower unit 2 to a working position on the lower side by ceasing to step down on the lift pedal 24.

Battery Container and Battery Pack

As shown in FIGS. 1 to 10, the battery container 8 includes: a support unit 30 for supporting the battery pack 9; a battery cover 31 which is opened on the rear side and is supported by the vehicle body frame 3 so as to be able to pivot up and down, and so forth. The support unit 30 includes: a bottom plate 32; right and left side plates 33; and a front plate 34, to thereby form a recessed space 35 for containing the battery pack. The battery cover 31 includes a first cover member 36 for covering the upper side of the battery pack 9, and a second cover member 37 for covering the rear side of the battery pack 9. The first cover member 36 and second cover member 37 pivot integrally between a closed position on the lower side and an open position on the upper side.

With the above configuration, the battery container 8 is configured so that the battery pack 9 is loaded and unloaded from the rear side of the traveling vehicle body 1.

As shown in FIGS. 1 to 14, the battery pack 9 includes a rechargeable battery unit 40, a battery case 50 in which the battery unit 40 is contained, and so forth. The battery unit 40 includes: a plurality of battery modules 41 having a plurality of battery cells (not shown); a management unit 42 for the battery for monitoring the state of each battery cell and controlling the output thereof; a junction box 43; a support frame 44 for supporting these members; a wire harness 45 which includes power lines, communication lines and the like; a connector 46 which is removably connected to a vehicle-side connector 25, and so forth. The battery case 50 is dust-proof and water-proof. The wire harness 45 and the connector 46 are connected to the vehicle-side connector 25 through an opening 34A which is formed in the front plate 34 of the support unit 30. The vehicle-side connector 25 is provided in an upper portion of the ECU 12 that is arranged below the operator seat 22.

As shown in FIGS. 4 to 13, the battery case 50 includes a containing case 51, which is open in its upper portion, and a container cover 52, which is removably attached to the upper portion of the containing case 51.

Thus, the battery unit 40 can be readily contained in the battery case 50.

As shown in FIGS. 6 to 13, the containing case 51 includes a bottom plate 53, right and left side plates 54, a front plate 55 and a rear plate 56, and thus forms a containing space 57 for the battery unit. The containing case 51 includes reinforcement members 58, which extend upward from four corners of the bottom plate 53.

As shown in FIGS. 1 to 14, the battery pack 9, which includes the plurality of battery modules 41, can store electric energy that enables long periods of mowing work. Meanwhile, this increases weight of the battery pack 9. To facilitate movement of the heavy battery pack 9, therefore, right and left wheels 60 for movement thereof are provided in a lower portion of the battery pack 9, and a handle 61 is provided in a rear portion of the battery pack 9.

As shown in FIGS. 1 to 3, the mower unit 2 is arranged between the right and left front wheels 4 and the right and left rear wheels 5. The mower unit 2 includes: a plurality of blades 70 which are driven to rotate; a housing 71 for covering the blades 70 from above; a second electric motor 72 for work which is supported in a rear portion of the housing 71; a belt-type transmission apparatus (not shown) for transmitting power from the second electric motor 72 to the blades 70; a transmission cover 73 for covering the second electric motor 72 and the belt-type transmission apparatus, and so forth. Power from the battery pack 9 is supplied to the second electric motor 72.

As shown in FIGS. 4 to 13, the battery container 8 includes: a guiding unit 80 for guiding the battery pack 9 between a loading/unloading position (see FIG. 4), at which the battery pack 9 is loaded onto and unloaded from the battery container 8, and a containing position (see FIG. 6), at which the battery pack 9 is contained. The battery pack 9 includes a guided unit 90, which is guided by the guiding unit 80. The guiding unit 80 includes right and left rollers 81. The guided unit 90 includes right and left engaging portions 91, which engage with the right and left rollers 81. When the battery pack 9 is loaded or unloaded at the loading/unloading position, the rollers 81 engage with the respective engaging portions 91, to thereby form and function as pivot fulcrums for enabling the battery pack 9 to pivot for loading/unloading relative to the battery container 8.

With the above configuration, when loading the battery pack 9 to the containing position, an operator performs a first moving operation in which he/she opens the battery cover 31 to open the recessed space 35 for containing the battery pack, and then holds the handle 61 to move the battery pack 9 to the loading/unloading position. Next, the operator, who is holding the handle 61, performs an engaging operation to engage the engaging portions 91 with the respective rollers 81 at the loading/unloading position, and then performs a pivoting operation to load the battery pack 9, with the rollers 81 acting as pivot fulcrums. Thereafter, the operator performs a second moving operation in which he/she moves the battery pack 9 from the loading/unloading position to the containing position while disengaging the engaging portions 91 from the rollers 81, under the guiding action by the guiding unit 80. Thus, the battery pack 9 can be loaded to the containing position.

Conversely, when removing the battery pack 9 from the containing position, the operator first performs a third moving operation in which he/she opens the battery cover 31 to open the recessed space 35 for containing the battery pack, and thereafter engages the engaging portions 91 to the respective rollers 81 while moving the battery pack 9 from the containing position to the loading/unloading position, under the guiding action by the guiding unit 80. Next, the operator performs a pivoting operation to hold the handle 61 to unload the battery pack 9, with the rollers 81 acting as pivot fulcrums at the loading/unloading position. Thereafter, the operator, who is holding the handle 61, performs a disengaging operation to disengage the engaging portions 91 from the rollers 81, and then performs a fourth moving operation to move the battery pack 9 from the loading/unloading position. Thus, the battery pack 9 can be removed from the containing position to the outside of the vehicle.

That is to say, as a result of the guiding unit 80 and the guided unit 90 being provided in addition to the right and left wheels 60 for movement and the handle 61, the operator can load the battery pack 9 to the containing position by performing the aforementioned opening operation, first moving operation, engaging operation, loading pivoting operation, and second moving operation. Conversely, the operator can remove the battery pack 9 from the containing position to the outside of the vehicle by performing the aforementioned opening operation, third moving operation, unloading pivoting operation, disengaging operation, and fourth moving operation.

When the operator performs the loading pivoting operation or unloading pivoting operation, displacement of the battery pack 9 outward of the vehicle body under its own weight can be avoided by the engagement between the rollers 81 and the engaging portions 91. Thus, when performing the loading pivoting operation or unloading pivoting operation, the operator does not need to manually stop the displacement of the battery pack 9 outward of the vehicle body under its own weight.

As a result, loading and unloading of the battery pack 9 onto/from the vehicle body can be facilitated while simplifying the configuration and reducing costs, etc.

Figure 4:
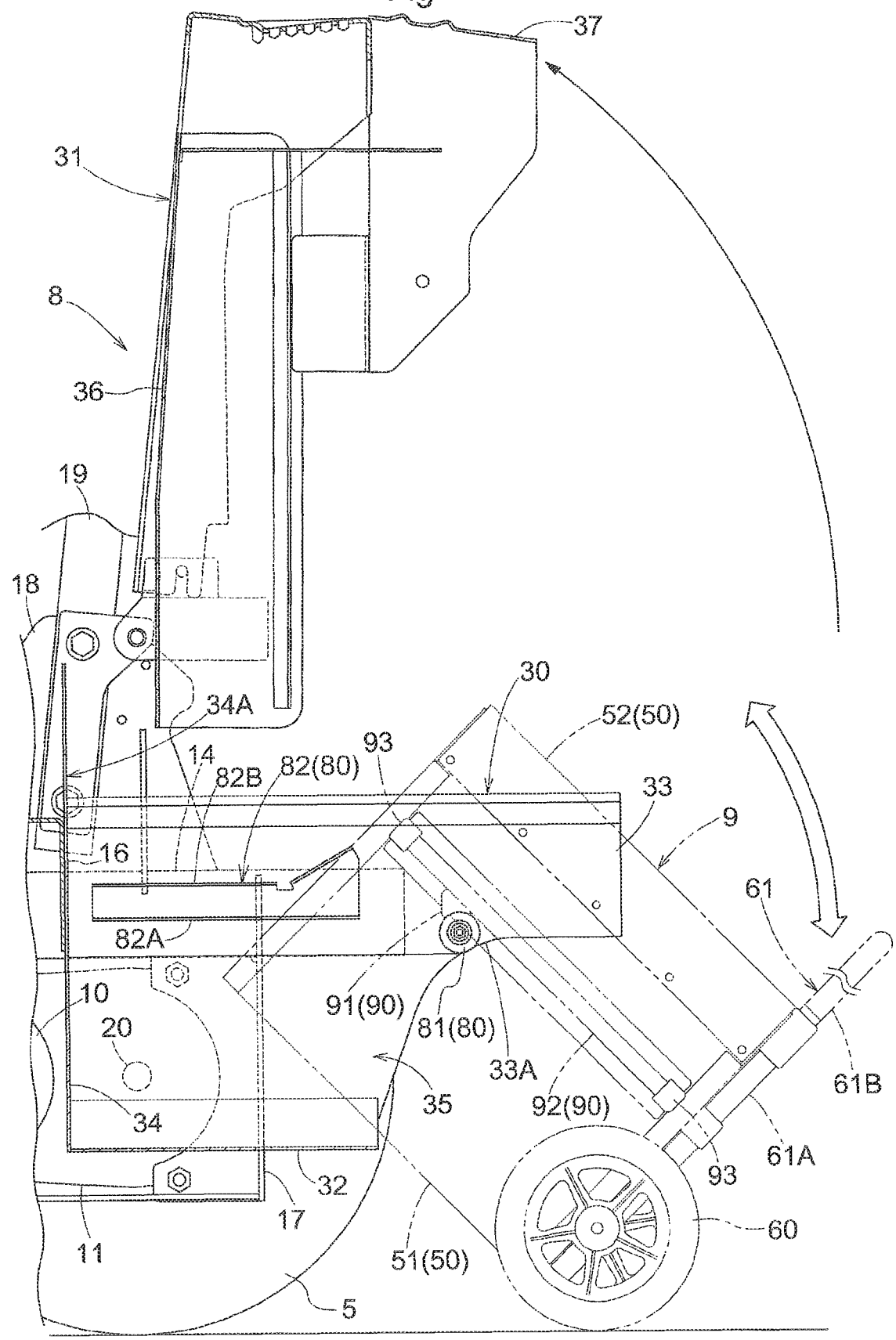
FIG. 4 is a vertical left side view of a vehicle body rear portion showing a configuration of a battery container and a battery pack, and also showing an unloading pivoting state of the battery pack at a loading/unloading position relative to the battery container.
Figure 5:
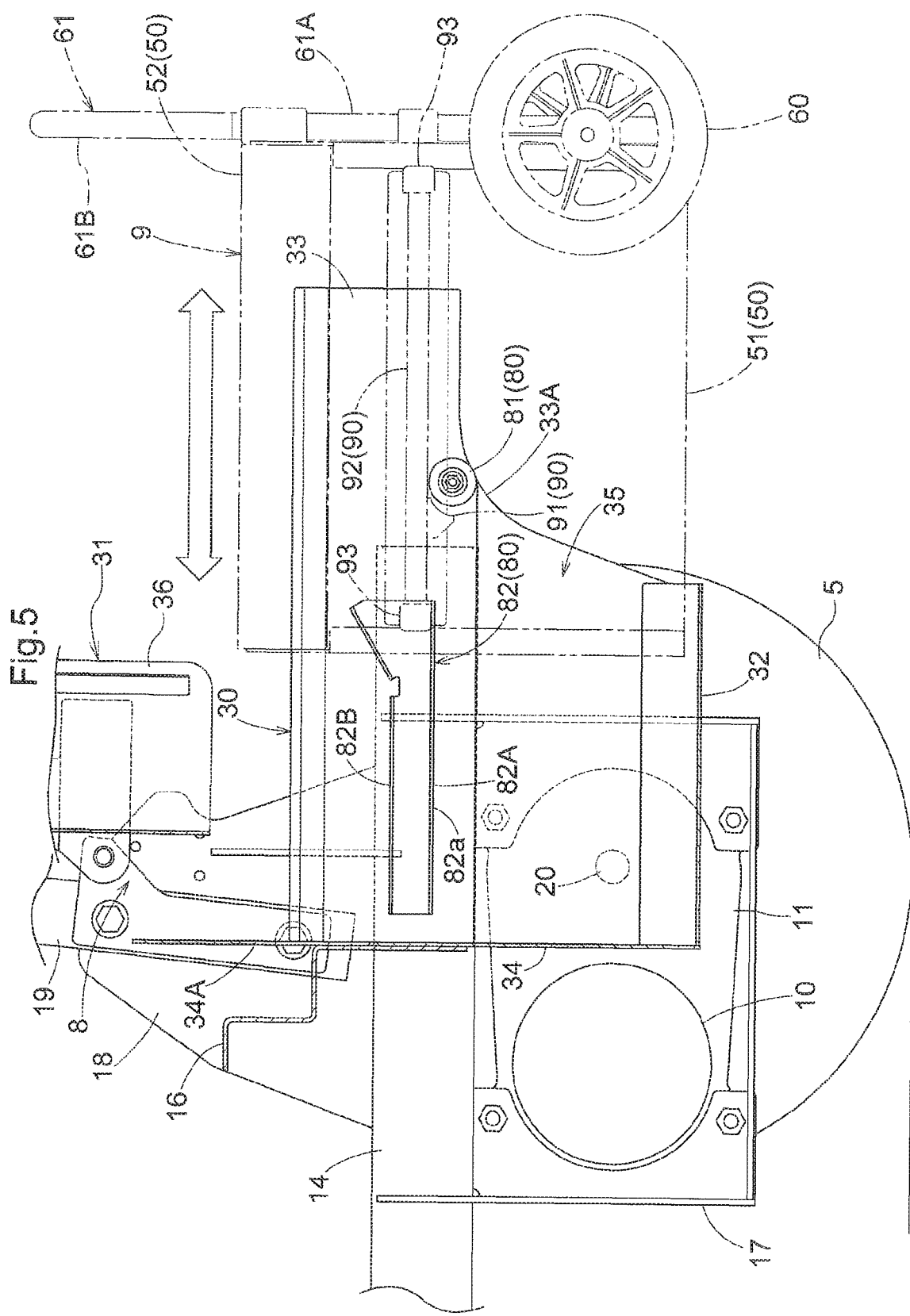
FIG. 5 is a vertical left side view of the vehicle body rear portion showing a configuration of the battery container and the battery pack, and also showing a state of the battery pack moving between the loading/unloading position and a containing position relative to the battery container.
Figure 6:
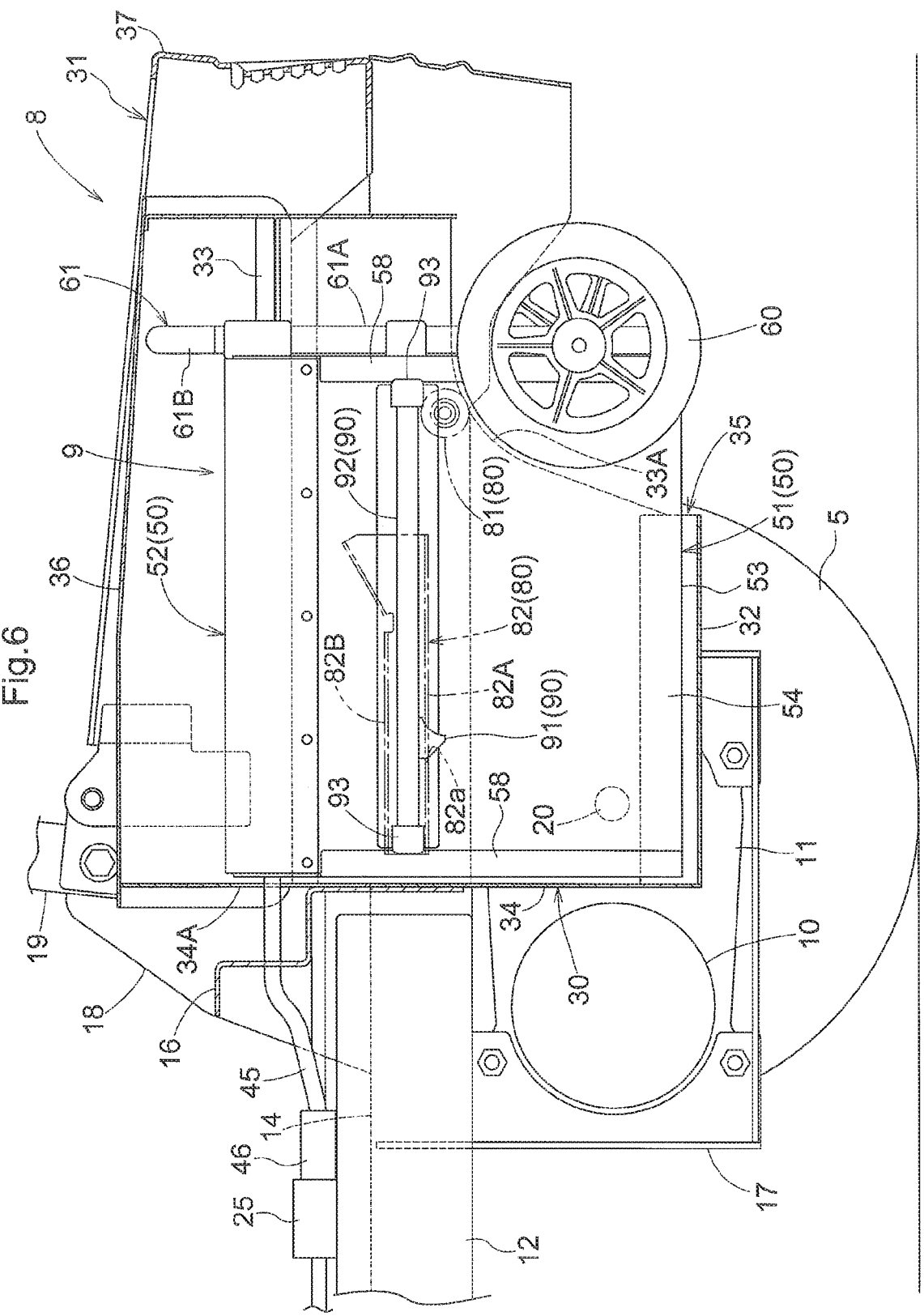
FIG. 6 is a vertical left side view of the vehicle body rear portion showing a configuration of the battery container and the battery pack, and also showing a state of the battery pack contained in the battery container.

As shown in FIGS. 4 and 5, the right and left rollers 81, which act as pivot fulcrums as described above, are located at or adjacent the centroid position of the battery pack 9 when the battery pack 9 is pivoted for unloading.

This configuration can reduce the amount of effort required by the operator when performing the pivoting operation to load the battery pack 9 or the pivoting operation to unload the battery pack 9 at the loading/unloading position.

As shown in FIGS. 4 to 6 and 10, the loading/unloading position is set at a rear end of the battery container 8. The containing position is set on a front side of the battery container 8, which is adjacent to the ECU 12. Regarding the support unit 30, the length by which the bottom plate 32 extends rearward is set to be short, in order to avoid contact with the bottom of the battery pack 9 that is pivoted for loading or unloading at the loading/unloading position. The support unit 30 is provided with a recessed portion 33A on a lower rear side of the right and left side plates 33, in order to avoid contact between the right and left wheels 60 and the battery pack 9 that is loaded to the containing position.

As shown in FIGS. 4 to 13, the guided unit 90 includes right and left guided rails 92, which span both ends of the battery pack 9 in the front-rear direction. The aforementioned right and left engaging portions 91 are arranged in lower faces of the guided rails 92 on a front side. The guiding unit 80 includes the aforementioned right and left rollers 81, and right and left guiding rails 82 for guiding the right and left guided rails 92. The rollers 81 are arranged so as to guide lower faces of the respective guided rails 92 to the loading/unloading position side of the battery container 8. The guiding rails 82 each include a lower guiding portion 82A for guiding a lower face of the corresponding guided rail 92, and an upper guiding portion 82B for guiding an upper face of the corresponding guided rail 92. The guiding rails 82 are arranged on the containing position side of the battery container 8, in a state of allowing the battery pack 9 to pivot for loading or unloading at the loading/unloading position.

With the above configuration, when loading the battery pack 9 to the containing position, the operator performs the aforementioned engaging operation and loading pivoting operation, and thereafter starts the aforementioned second moving operation. Then, as the upper faces of the guided rails 92 are guided by the respective upper guiding portions 82B, downward pivoting of the battery pack 9 with the rollers 81 acting as pivot fulcrums is stopped. Thereafter, upon the second moving operation being completed, the guided rails 92 are received and supported on the rear side thereof from below by the rollers 81, and the guided rails 92 are also received and supported on the front side thereof from below by the lower guiding portions 82A. Thus, the battery pack 9 is located at the containing position in a state where its movement from the containing position is suppressed.

When removing the battery pack 9 from the containing position, upon the operator performing the aforementioned third moving operation, the upper faces of the guided rails 92 are guided by the respective upper guiding portions 82B until the battery pack 9 reaches the loading/unloading position. As a result, downward pivoting of the battery pack 9 with the rollers 81 acting as pivot fulcrums is stopped. Upon the battery pack 9 reaching the loading/unloading position, the guiding of the upper faces of the guided rails 92 by the upper guiding portions 82B is canceled, and downward pivoting of the battery pack 9 is allowed. Thus, the operator can perform the aforementioned unloading pivoting operation.

That is to say, downward pivoting of the battery pack 9 is stopped due to the effect of the upper guiding portions 82B while the battery pack 9 moves between the loading/unloading position and the containing position. Therefore, the operator no longer needs to manually stop downward pivoting of the battery pack 9. When the battery pack 9 is located at the containing position, the stability of the battery pack 9 can be ensured.

As a result, it is possible to reduce the amount of effort required by the operator when moving the battery pack 9 between the loading/unloading position and the containing position, while ensuring the stability of the battery pack 9 at the containing position.

Figure 7:
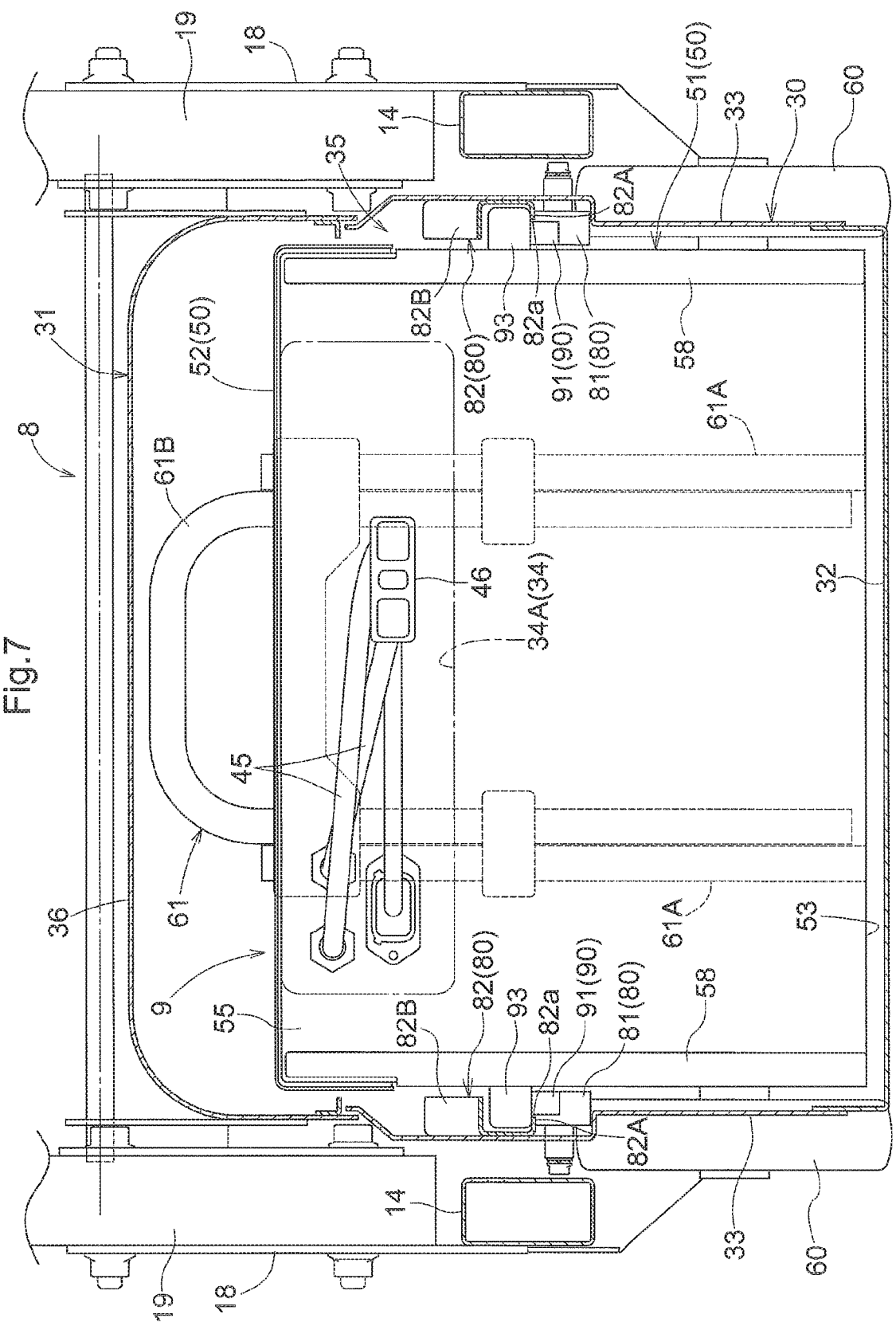
FIG. 7 is a vertical elevational view of the vehicle body rear portion showing a configuration of the battery container and the battery pack.
Figure 8:
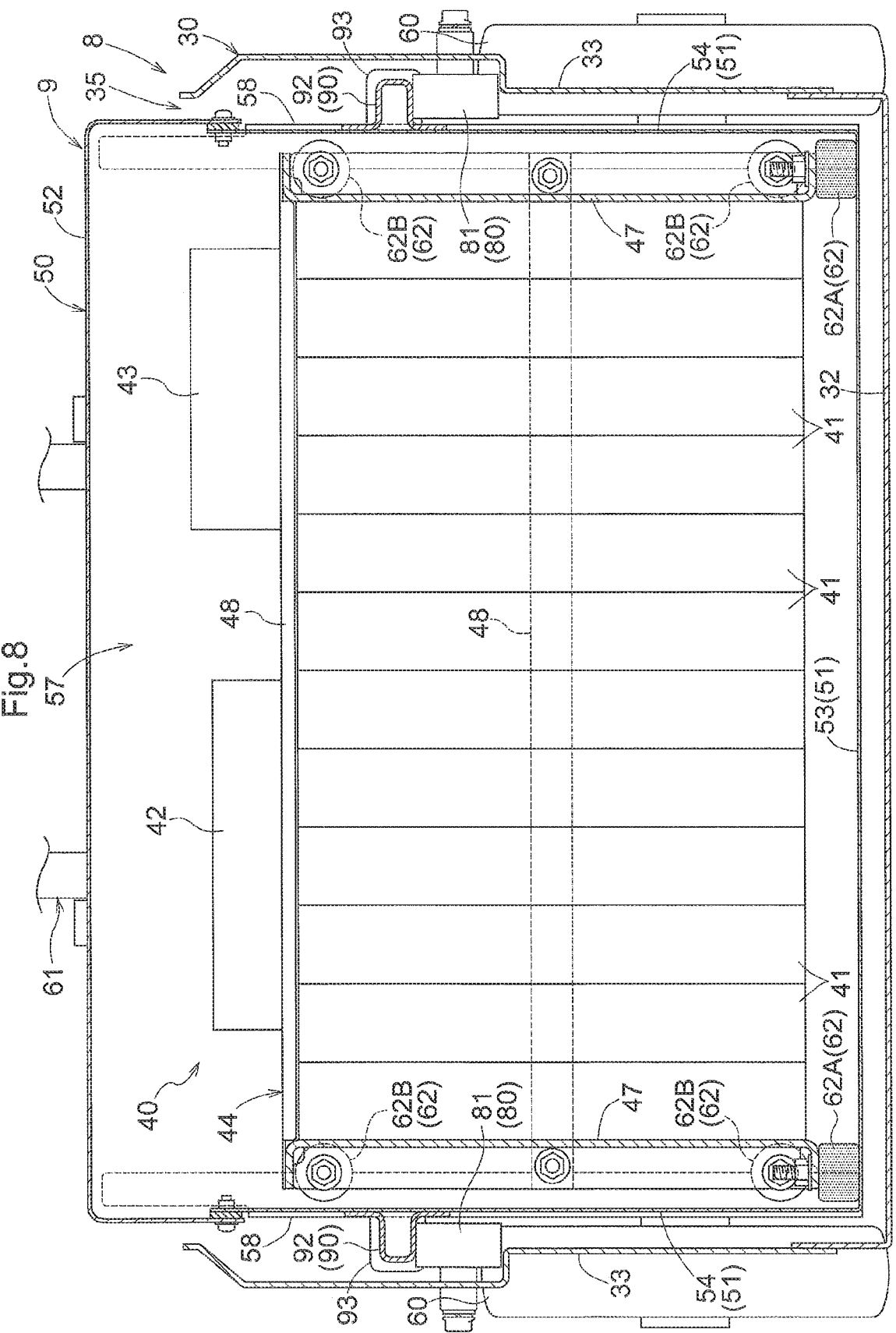
FIG. 8 is a vertical elevational view of the battery container showing a configuration of a guiding unit, a guided unit, etc.
Figure 9:
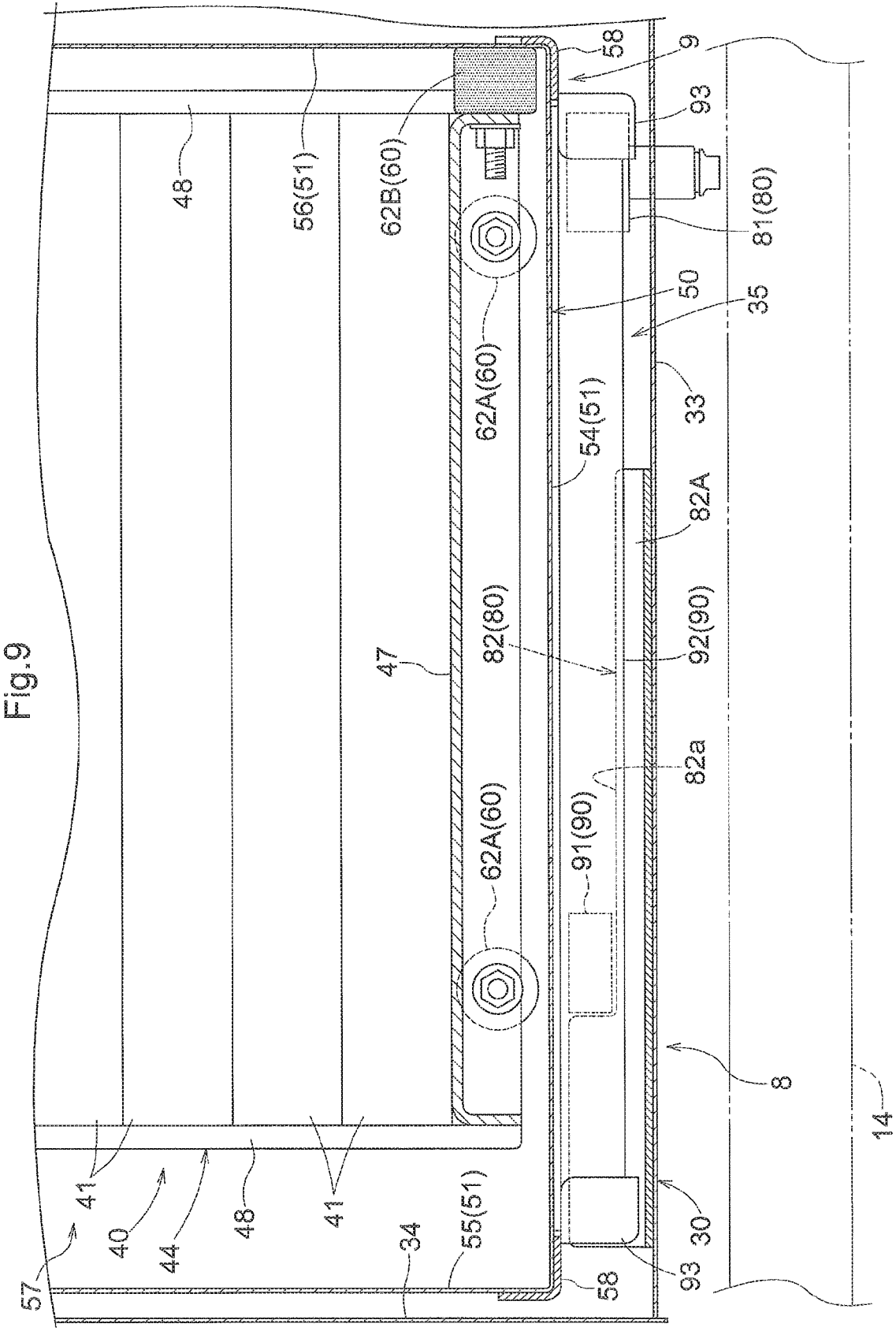
FIG. 9 is a transversal plan view of the left side of the battery container showing a configuration of the guiding unit, the guided unit, etc.
Figure 10:
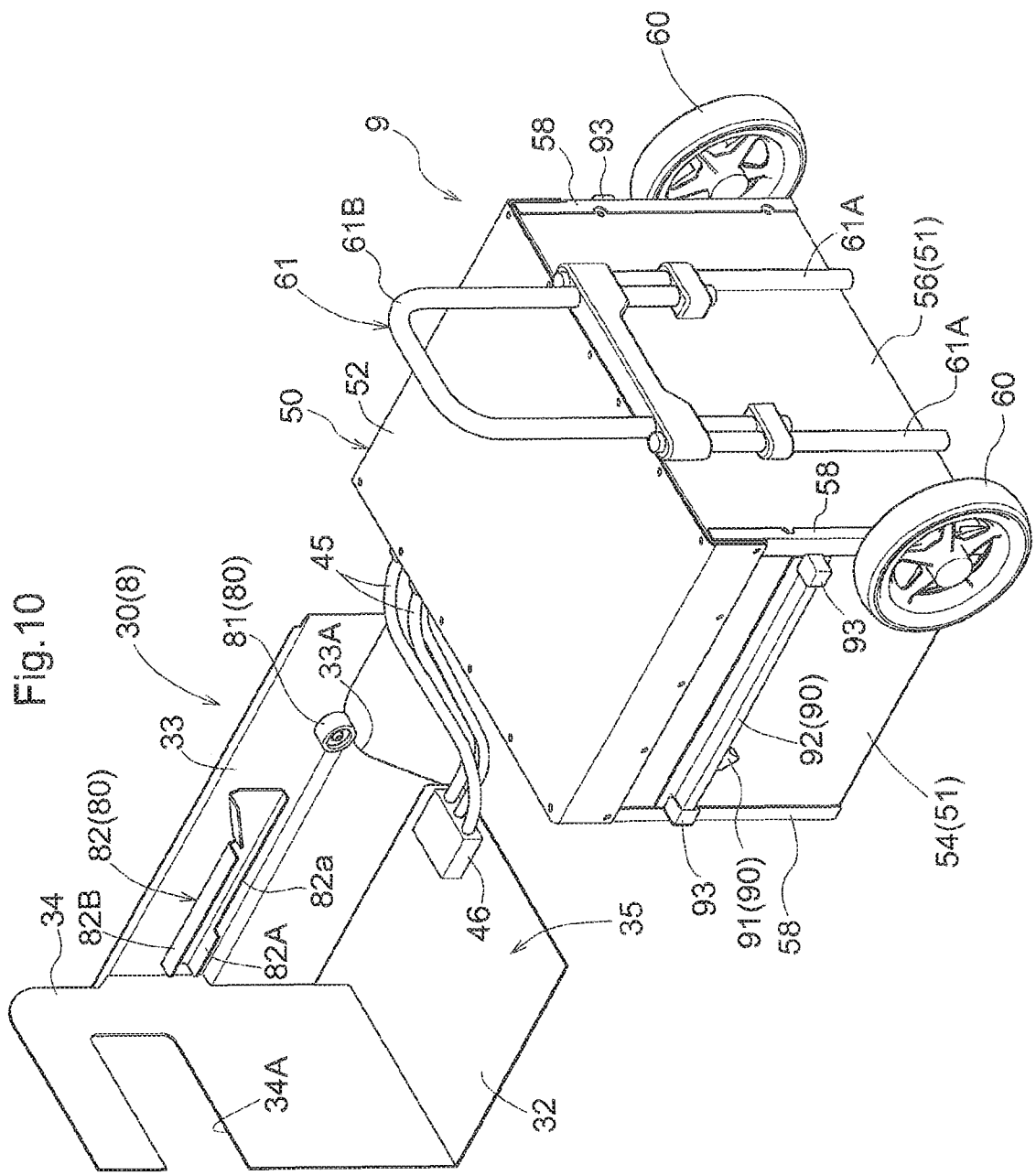
FIG. 10 is a partial vertical perspective view showing a configuration of the battery container and the battery pack.
Figure 11:
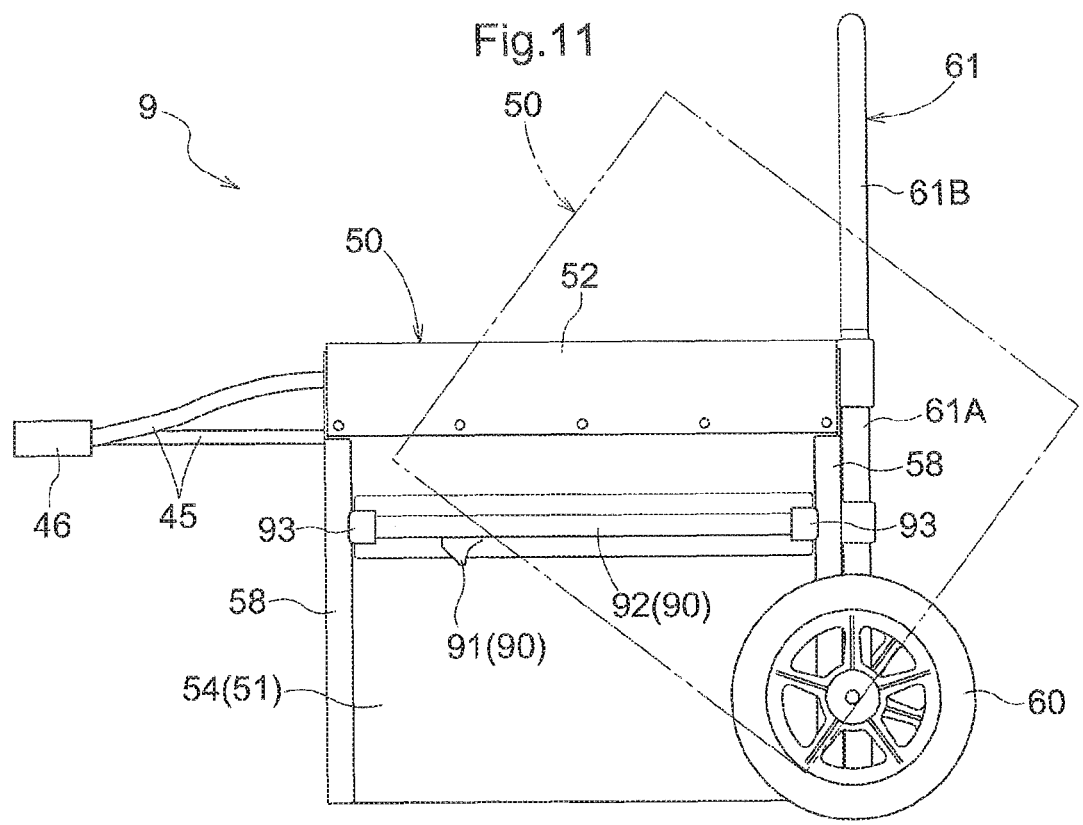
FIG. 11 is a left side view of the battery pack.
Figure 12:
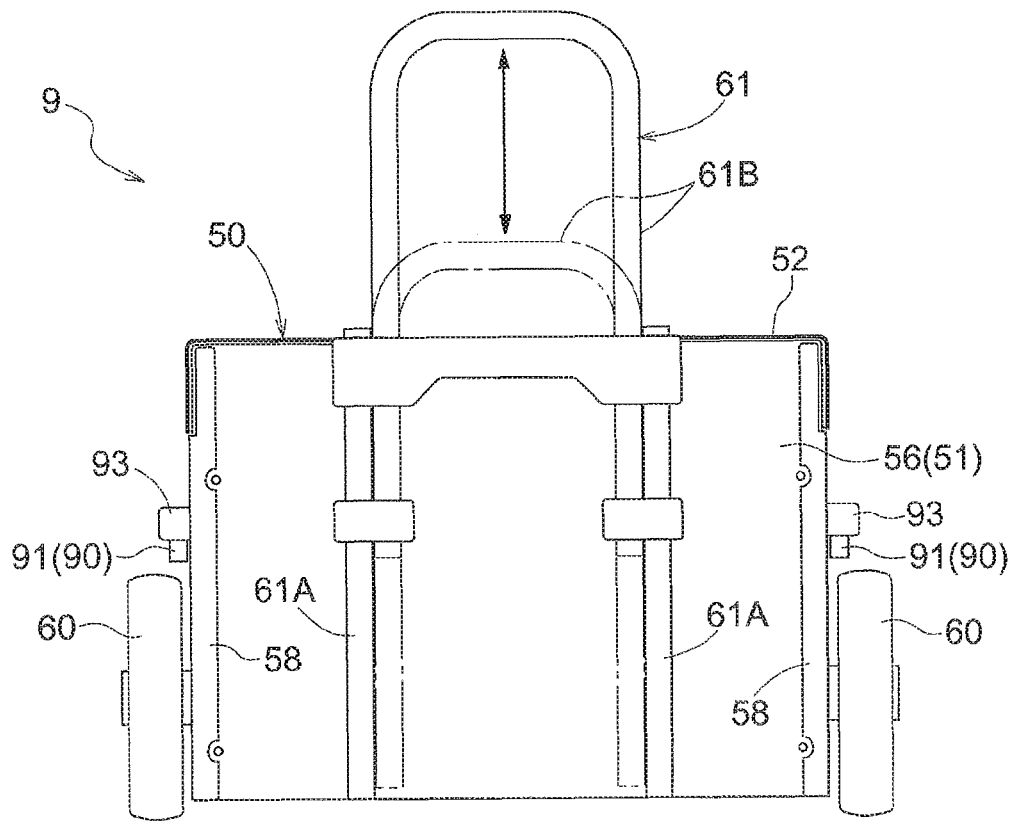
FIG. 12 is a rear view of the battery pack.
Figure 13:
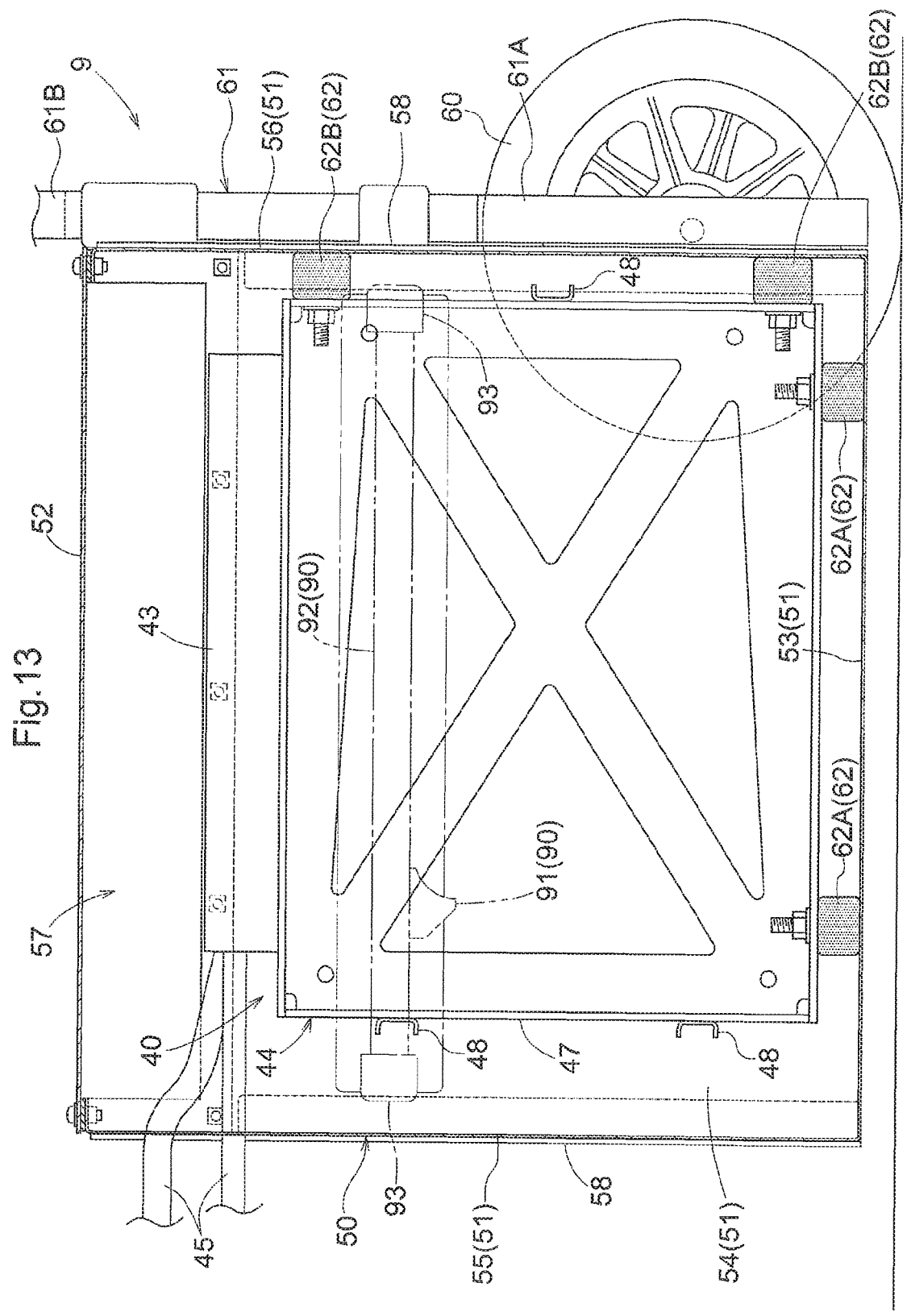
FIG. 13 is a vertical left side view of the battery pack showing a configuration of the battery pack, attaching positions of vibration-isolating members, etc.
Figure 14:
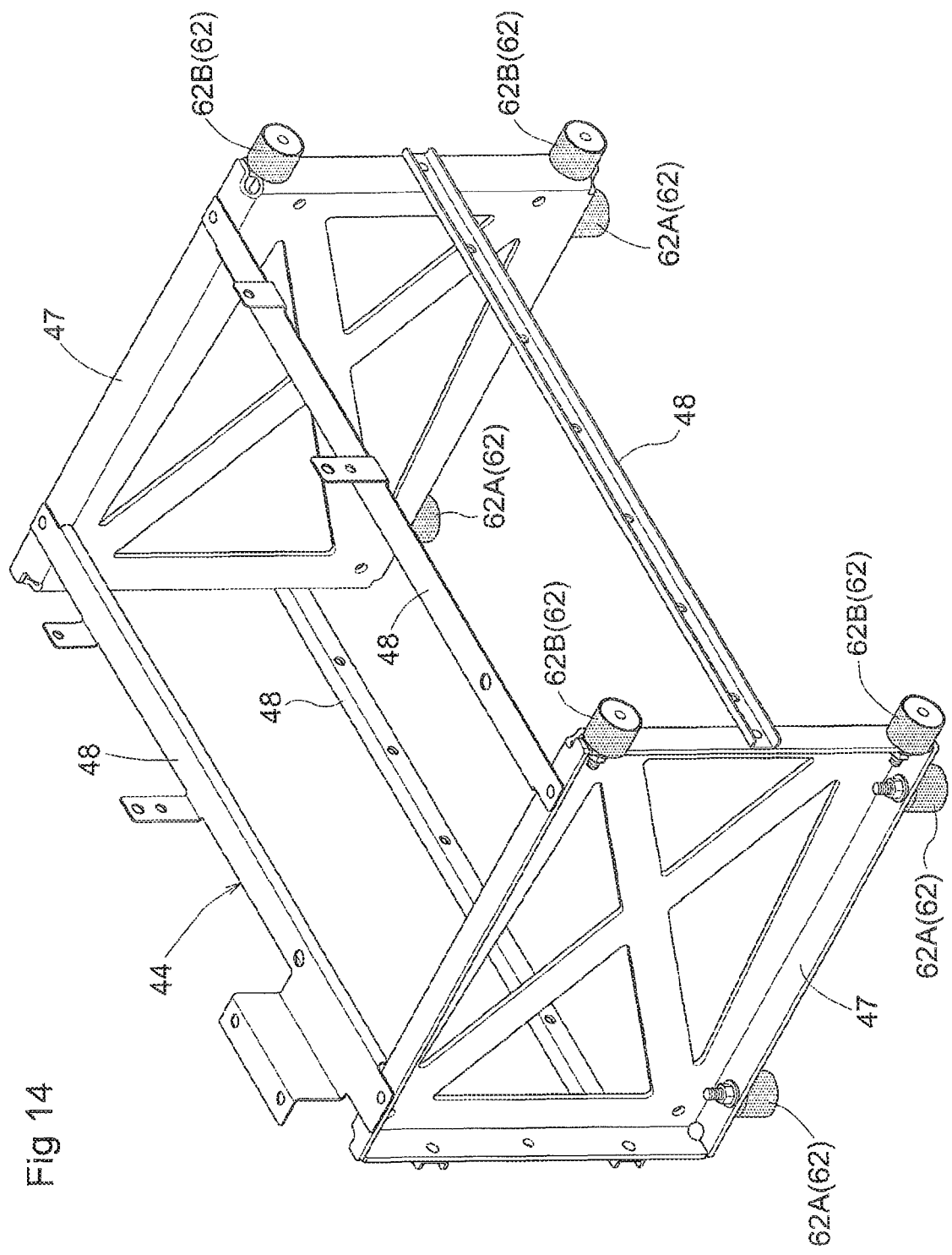
FIG. 14 is a perspective view of a primary portion showing a configuration of a support frame and the attaching positions of the vibration-isolating members.

As shown in FIGS. 7 and 9, cutout portions 82a for avoiding contact with the right and left engaging portions 91 are formed in the lower guiding portions 82A.

As shown in FIGS. 4 to 6, 9 and 10, the right and left rollers 81 are supported on a rear side of the right and left side plates 33 of the support unit 30. The right and left guiding rails 82 are supported on a front side of the right and left side plates 33.

As shown in FIGS. 4 to 7 and 10, rear ends of the upper guiding portions 82B of the right and left guiding rails 82 tilt with the rear side thereof raised.

With this configuration, even if the operator starts the second moving operation immediately before the loading pivoting operation at the loading/unloading position is completed, the guided rails 92 can be reliably guided into guiding areas of the respective guiding rails 82 by the rear ends of the upper guiding portions 82B.

As a result, loading and unloading of the battery pack 9 onto/from the vehicle body can be further facilitated.

As shown in FIGS. 4 to 13, the right and left guided rails 92 and the right and left engaging portions 91 are provided in right and left outer faces of the battery case 50.

This configuration makes it easy for the operator to visually check when positioning the right and left guided rails 92 and the right and left engaging portions 91 relative to the right and left rollers 81, facilitating the operation to load the battery pack 9.

As shown in FIGS. 4 to 6, 9 to 11 and 13, the right and left guided rails 92 have a length in the front-rear direction with which they span both ends in the front-rear direction of the battery case 50.

With this configuration, the right and left guided rails 92 can also be used as reinforcement members for reinforcing both right and left side portions of the battery case 50. As a result, the strength of the battery case 50 can be increased with a simplified configuration.

As shown in FIGS. 4 to 13, the right and left guided rails 92 each have end members 93, which are made of resin, at both ends thereof in the front-rear direction. In the aforementioned second moving operation and third moving operation, the guided rails 92 are guided by the respective rollers 81, and the end members 93 provided on the front side are guided by the guiding rails 82. When the battery pack 9 is located at the containing position, the guided rails 92 are received and supported on the rear side thereof from below by the rollers 81, and the end members 93 provided on the front side are received and supported from below by the lower guiding portions 82A of the respective guiding rails 82.

With this configuration, the stability of the battery pack 9 at the containing position can be ensured while allowing the second moving operation and third moving operation to be smoothly performed.

As shown in FIGS. 1 to 8 and 11 to 13, the right and left wheels 60 are arranged in a lower portion at a rear end of the battery pack 9, so that lower portions of the wheels 60 are located below the bottom face of the battery pack 9 (bottom face of the battery case 50), and so that rear portions of the wheels 60 are located rearward of a rear face of the battery pack 9 (rear face of the battery case 50). The handle 61 extends from the rear portion of the battery pack 9 with its top above the battery pack 9.

With the above configuration, when the battery pack 9 has been removed from the vehicle body and is in a state of being stored at a given storage position or charging position, for example, a front lower end of the battery pack 9 and the right and left wheels 60 are grounded. Thus, an inconvenient, unexpected movement of the battery pack 9 in a stored state can be suppressed.

When performing the aforementioned first moving operation or fourth moving operation, the operator can readily raise the front side of the battery pack 9 with the right and left wheels 60 acting as fulcrums, by holding the handle 61 on the upper side thereof and displacing the handle 61 to the lower rear side. Thus, the first moving operation and fourth moving operation, which are performed with the front side of the battery pack 9 raised, are facilitated.

Furthermore, the operator can easily transition from the first moving operation to the aforementioned engaging operation, and transition from the aforementioned disengaging operation to the fourth moving operation by raising the front side of the battery pack 9 when performing the first moving operation and fourth moving operation.

As a result, unexpected movement of the battery pack 9 in a stored state can be suppressed while further facilitating loading and unloading of the battery pack 9 onto/from the vehicle body.

As shown in FIGS. 4 to 7 and 11 to 13, the handle 61, which is extendable, includes right and left fixed portions 61A which are fixed to the battery pack 9; and an arch-shaped movable portion 61B which is capable of undergoing sliding displacement relative to the fixed portions 61A. The fixed portions 61A are located with upper ends thereof being at substantially the same height as the upper end of the battery pack 9. The movable portion 61B is supported by the fixed portions 61A so as to be able to be displaced between a use position, which is located above the fixed portions 61A, and a storage position, which is located at substantially the same height as the fixed portions 61A.

With the above configuration, for example, upon the operator sliding the movable portion 61B to displace it from the storage position to the use position when performing the aforementioned loading pivoting operation or unloading pivoting operation, the extension length of the handle 61, which extends upward from an upper end of the battery pack 9, increases, and the distance from the pivot fulcrums of the battery pack 9 to the upper end of the handle 61 increases. With this configuration, the operator can reduce the amount of effort required for the loading pivoting operation or unloading pivoting operation for the battery pack 9 by holding the handle 61 on the upper end side thereof.

For example, upon the operator sliding the movable portion 61B to displace it from the storage position to the use position when performing the first moving operation or fourth moving operation with the front side of the battery pack 9 raised, the extension length of the handle 61, which extends upward from an upper end of the battery pack 9, increases, and the distance from the right and left wheels 60 to the upper end of the handle 61 increases. With this configuration, the operator can reduce the amount of effort required for these moving operations by holding the handle 61 on the upper end side thereof.

For example, upon the operator sliding the movable portion 61B to displace it from the use position to the storage position when putting the battery pack 9 into the battery container 8, or when removing the battery pack 9 from the vehicle body and storing the battery pack 9 at a given storage position or charging position, the extension length of the handle 61, which extends upward from the upper end of the battery pack 9, becomes short. As a result, the space for arranging the battery pack 9 required in the battery container 8 or a place for storing the battery pack 9 can be made smaller.

Although not shown in the diagrams, the battery container 8 includes, in the battery cover 31, a fixation tool for fixing the battery pack 9 to the containing position. The fixation tool stops displacement of the battery pack 9 from the containing position by coming into contact with the battery pack 9 at the containing position at the time of an operation to close the battery cover 31.

With this configuration, the operator can fix the battery pack 9 at the containing position by performing the operation to close the battery cover 31 after loading the battery pack 9 to the containing position. As a result, displacement of the battery pack 9 from the containing position due to vibrations that occur during travel, for example, can be avoided.

As shown in FIGS. 8, 9, 13 and 14, the battery pack 9 includes eight block-shaped rubber cushions (an example of vibration-isolating members) 62. The rubber cushions 62 are located between the battery case 50 and the battery unit 40 to support the battery unit 40 in a vibration-isolating manner.

With the above configuration, the battery unit 40 is supported in a vibration-isolating manner by the rubber cushions 62 within the battery case. With this configuration, when the aforementioned first moving operation, engaging operation, loading pivoting operation, second moving operation, third moving operation, unloading pivoting operation, disengaging operation, or fourth moving operation is performed, vibrations that occur during these operations are unlikely to be transmitted to the battery unit 40 due to the effect of the rubber cushions 62. Also, when the battery pack 9 is contained in the battery container 8, vibrations that occur during travel, for example, are unlikely to be transmitted to the battery unit 40.

That is to say, as a result of the battery unit 40 being supported in a vibration-isolating manner within the battery case, the battery unit 40 can be favorably isolated from vibrations, regardless of whether operations to attach or detach the battery pack 9 are performed or the battery pack 9 is contained in the battery container 8.

As a result, it is possible to avoid adverse effects caused by the vibrations that occur at the time of attachment and detachment or during travel, for example, from being exerted on the battery unit 40.

The rubber cushions 62 are located between the battery case 50 and the support frame 44 of the battery unit 40 to support the battery unit in a vibration-isolating manner.

With this configuration, the number of rubber cushions 62 required for vibration-isolating support can be reduced, compared with the case of individually supporting the battery modules 41, the management unit 42, the junction box 43, and the like in the battery unit 40 in a vibration-isolating manner. The battery modules 41 and the management unit 42 can be connected so as not to be relatively displaced relative to each other.

As a result, the battery modules 41 can be favorably connected to the management unit 42 while reducing costs related to vibration-isolating support of the battery unit 40 and improving the assembly, for example.

The battery pack 9 includes, as the aforementioned rubber cushions 62, four first rubber cushions (an example of first vibration-isolating members) 62A, which are arranged between the bottom plate 53 of the battery case 50 and the bottom face of the battery unit 40, and four second rubber cushions (an example of second vibration-isolating members) 62B, which are arranged between the rear plate 56 of the battery case 50 and the rear face of the battery unit 40.

With the above configuration, when the front side of the battery pack 9 is raised during the aforementioned first moving operation, fourth moving operation, loading pivoting operation, or unloading pivoting operation, for example, the battery unit 40 can be stably supported in a vibration-isolating manner by the first rubber cushions 62A and second rubber cushions 62B within the battery case.

With this configuration, the battery unit 40 can be stably supported while making it less likely that vibrations that occur during these operations, for example, are transmitted to the battery unit 40.

The support frame 44 of the battery unit 40 includes right and left first members 47, which are rectangular, a plurality of second members 48, which span the right and left first members 47, and so forth. The support frame 44 supports the management unit 42 and the junction box 43, using the front and rear second members 48 that are arranged thereabove.

The first rubber cushions 62A are attached to both ends, in the front-rear direction, of the bottom face of the right and left first members 47. The second rubber cushions 62B are attached to both ends, in the vertical direction, of the rear face of the right and left first members 47.

Other Embodiments

Other embodiments of the present invention will be described below. Some of the other embodiments listed below may be selected and applied to the above-described embodiment, provided there is no inconsistency.

The configuration of the electric work vehicle can be modified in various manners.

[1] For example, the electric work vehicle may have the battery container 8 in a front portion of the traveling vehicle body 1, and may have the driving unit 7 on the rear side of the traveling vehicle body 1.

[2] For example, the electric work vehicle may have, in the traveling vehicle body 1, the right and left first electric motors 10 for traveling and the second electric motor 72 for work.

[3] For example, the electric work vehicle may have, in the traveling vehicle body 1, a single electric motor for both traveling and work.

[4] For example, the electric work vehicle may have right and left steerable front wheels 4, and a steering wheel for steering the front wheels, or the like.

[5] For example, the electric work vehicle may be of a semi-crawler type with right and left crawlers, instead of the right and left rear wheels 5.

[6] For example, the electric work vehicle may be of a full-crawler type with right and left crawlers, instead of the right and left front wheels 4 and the right and left rear wheels 5.

[7] For example, the electric work vehicle may be an electric front mower in which the mower unit 2 is joined to a front portion of the traveling vehicle body 1 so as to be able to be raised and lowered.

[8] For example, the electric work vehicle may be an electric mowing machine that includes a grass collection container for storing mowed grass.

The configuration of the battery container 8 can be modified in various manners.

[1] For example, the battery container 8 may be configured so that the battery pack 9 is loaded and unloaded from the front side of the traveling vehicle body 1. The battery container 8 may be configured so that the battery pack 9 is loaded and unloaded from a lateral side of the traveling vehicle body 1.

[2] For example, the battery container 8 may have a battery cover 31 that can be opened on the front side, or a battery cover 31 that can be opened on a lateral side, in accordance with the direction in which the battery pack 9 is loaded and unloaded.

[3] For example, the battery container 8 may include a battery cover 31 that is removably supported by the vehicle body frame 3.

[4] For example, the battery container 8 may have, as a fixation tool for fixing the battery pack 9 at the containing position, a fixation band that is removably attached to the battery container 8 so as to receive and hold the battery pack 9 at the containing position, a removable joint tool for joining the battery pack 9 at the containing position to the support unit 30 or the like, or a stopper that engages with the right and left rollers 81 or the like when the battery pack 9 is loaded to the containing position to stop displacement of the battery pack 9 from the containing position.

[5] For example, the battery pack 8 may have two pairs of guiding units 80, the two pairs being arranged in the left-right direction, to contain two battery packs 9 having a narrow lateral width side-by-side in the left-right direction.

[6] For example, the battery container 8 may not have the guiding unit 80, and may be configured so that the battery pack 9 is attached at the containing position in an immovable manner.

The configuration of the battery pack 9 can be modified in various manners.

[1] For example, in the battery pack 9, a plurality of battery modules 41 that are in the form of a unit, the management unit 42 for the battery, and the junction box 43 may be individually supported in a vibration-isolating manner within the battery case 50.

[2] For example, the battery pack 9 may have a configuration in which a plurality of vibration-isolating members (rubber cushions 62) are arranged in the bottom face of the battery case 50, and the battery pack 9 is supported in a vibration-isolating manner by the battery container 8 via the plurality of vibration-isolating members (rubber cushions 62) at the containing position.

[3] For example, the battery pack 9 may include a plurality of first vibration-isolating members (first rubber cushions 62A), which are arranged between the bottom plate 53 of the battery case 50 and the bottom face of the battery unit 40, a plurality of second vibration-isolating members (second rubber cushions 62B), which are arranged between the rear plate 56 of the battery case 50 and the rear face of the battery unit 40, and a plurality of third vibration-isolating members, which are arranged between the front plate 55 of the battery case 50 and the front face of the battery unit 40.

[4] For example, the battery pack 9 may be configured so that the battery unit 40 is supported in a vibration-isolating manner by the battery case 50 via a plurality of vibration-isolating members (rubber cushions 62) that are attached to the battery case 50.

[5] For example, the battery pack 9 may have, as a plurality of wheels 60 for movement, a single front wheel and right and left rear wheels. Otherwise, the battery pack 9 may have, as a plurality of wheels 60 for movement, right and left front wheels and right and left rear wheels.

[6] For example, the battery pack 9 may be of a foldable type in which the handle 61 has a fixed portion 61A that is fixed to the battery pack 9, and a movable portion 61B capable of swinging and being displaced relative to the movable portion 61A.

[7] For example, the battery pack 9 may be configured so that the upper end of the fixed portion 61A of the handle 61 is arranged at a position at the same height as the upper end of the battery pack 9.

[8] For example, the battery pack 9 may be configured so that the entire handle 61 is supported by the battery pack 9 so as to be displaced relative to the battery pack 9.

Figure 15:
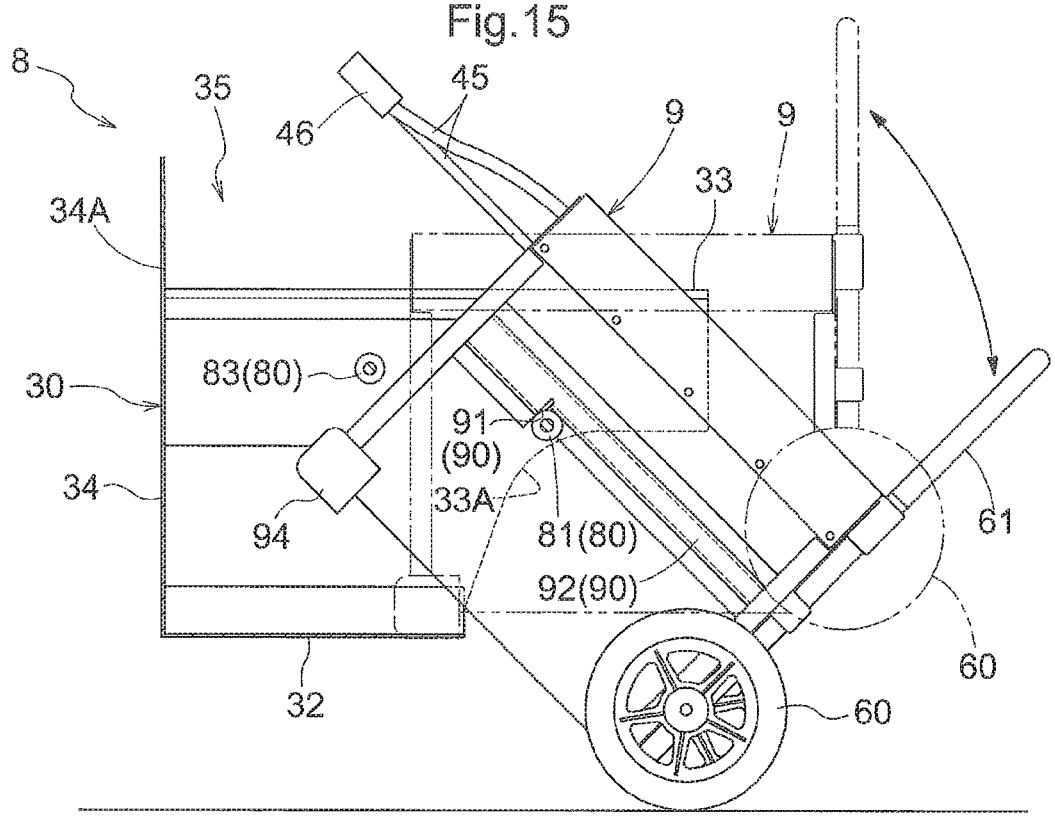
FIG. 15 is a vertical left side view according to another embodiment showing a configuration of a battery container and a battery pack, and also showing a loading pivoting state of the battery pack at a loading/unloading position relative to the battery container.
Figure 16:
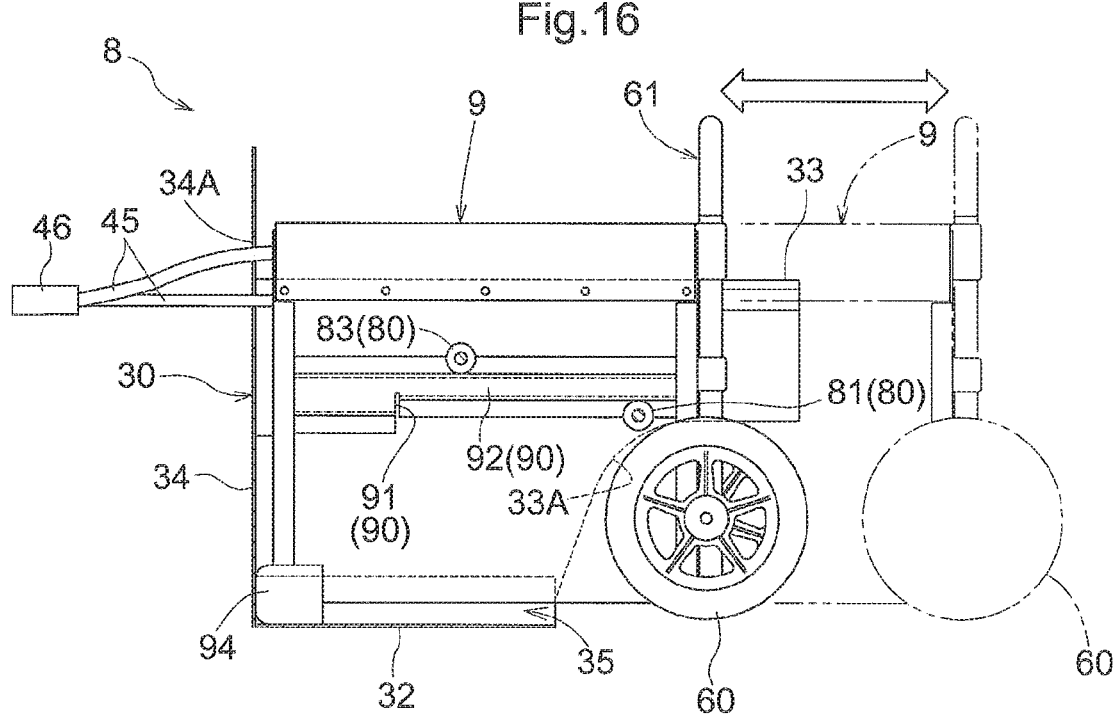
FIG. 16 is a diagram illustrating a movement of the battery pack shown in FIG. 15 between the loading/unloading position and a containing position.

[9] For example, the battery pack 9 may be configured as shown in FIGS. 15 and 16.

In the configuration shown in FIGS. 15 and 16, the battery pack 9 has, in a front lower end portion thereof, right and left ground members 94, which are made of rubber and are grounded when the battery pack 9 is removed from the vehicle body and is stored at a given storage position or charging position, for example.

With this configuration, when the battery pack 9 has been removed from the vehicle body and is in a state of being stored at a given storage position or charging position, for example, the right and left ground members 94 and the right and left wheels 60 of the battery pack 9 are grounded. Thus, an inconvenient, unexpected movement of the battery pack 9 in a stored state can be more reliably suppressed.

[10] For example, the battery pack 9 may not have the guided unit 90, and may be configured so as to be immovably attached at the containing position in the battery container 8.

The configuration of the battery container 8, and the guiding unit 80 and guided unit 90 in the battery pack 9 can be modified in various manners.

[1] For example, the guiding unit 80 and guided unit 90 may be configured so that the pair of rollers 81 and the pair of guiding rails 82 are arranged on the bottom plate 32 of the support unit 30, and the right and left engaging portions 91 and the right and left guided rails 92 are arranged on the bottom face of the battery case 50.

[2] For example, the guiding unit 80 and guided unit 90 may be configured so that the right and left rollers 81 functioning as pivot fulcrums for enabling the battery pack 9 to pivot for loading and unloading, as well as the right and left guided rails 92 are arranged in the guided unit 90, and the pair of engaging portions 91, which engage with the respective rollers 81, and the pair of guiding rails 82 for guiding the right and left rollers 81 and right and left guided rails 92 are arranged in the guiding unit 80.

[3] For example, the guiding unit 80 and guided unit 90 may be configured as shown in FIGS. 15 and 16.

In the configuration shown in FIGS. 15 and 16, the guided unit 90 includes the right and left engaging portions 91 and the right and left guided rails 92 that span both ends of the battery pack 9 in the front-rear direction. The right and left engaging portions 91 are steps that are formed in the lower faces of the right and left guided rails 92 on the front side. The guiding unit 80 includes right and left rollers 81 (hereinafter referred to as "first rollers 81" in this embodiment) for guiding lower faces of the right and left guided rails 92, and right and left second rollers 83 for guiding upper faces of the right and left guided rails 92. The right and left first rollers 81 are arranged on the loading/unloading position side of the battery container 8, in a state of functioning as pivot fulcrums for enabling the battery pack 9 to pivot for loading and unloading. The right and left second rollers 83 are arranged at positions on the containing position side relative to the right and left first rollers 81 in the battery container 8, in a state of allowing the battery pack 9 to pivot for loading and unloading at the loading/unloading position.

With the above configuration, when loading the battery pack 9 to the containing position, the operator engages the right and left engaging portions 91 with the right and left first rollers 81 during the aforementioned engaging operation. The operator then performs the aforementioned loading pivoting operation, and thereafter starts the aforementioned second moving operation. As the upper faces of the guided rails 92 are guided by the respective second rollers 83, downward pivoting of the battery pack 9 with the first rollers 81 acting as pivot fulcrums is stopped. Thereafter, upon the second moving operation being completed, the battery pack 9 is located at the containing position.

Upon the operator performing the aforementioned third moving operation when removing the battery pack 9 from the containing position, downward pivoting of the battery pack 9 with the first rollers 81 acting as pivot fulcrums is stopped as a result of the upper faces of the guided rails 92 being guided by the respective second rollers 83, until the battery pack 9 reaches the loading/unloading position. Upon the battery pack 9 reaching the loading/unloading position, the guiding of the upper faces of the guided rails 92 by the second rollers 83 is canceled, and downward pivoting of the battery pack 9 is allowed. Thus, the operator can perform the aforementioned unloading pivoting operation.

That is to say, downward pivoting of the battery pack 9 is stopped, due to the effect of the second rollers 83, while the battery pack 9 moves between the loading/unloading position and the containing position. Therefore, the operator no longer needs to manually stop downward pivoting of the battery pack 9.

As a result, it is possible to reduce the amount of effort required by the operator when moving the battery pack 9 between the loading/unloading position and the containing position.

[4] For example, the guiding unit 80 and guided unit 90 may be configured so that the aforementioned right and left rollers 81, which serve as pivot fulcrums, are located at a centroid position of the battery pack 9 when the battery pack 9 pivots for loading and unloading.

The vibration-isolating members are not limited to the rubber cushions 62 in the above-described embodiment, and various types of vibration-isolating members may be employed.

[1] For example, the vibration-isolating members may be mat-like rubber cushions.

[2] For example, the vibration-isolating members each may be a combination of a rubber and a spring.

[3] For example, the vibration-isolating members each may be a combination of a rubber and an air cushion.

[4] For example, the vibration-isolating members each may be a cushion material that is assembled with an outer face of the battery unit 40 or an inner face of the battery case 50.

Although an electric mowing machine has been described as an example of an electric work vehicle in the above-described embodiment, the electric work vehicle is not limited thereto. The electric work vehicle may be an electric tractor, an electric paddy field planting machine, or an electric carrier vehicle that includes a battery pack to be contained in a battery container.

What is claimed is:

1. An electric work vehicle comprising:
    a traveling vehicle body;
    a battery container provided in the traveling vehicle body;
    a battery pack that is removably attached to the battery container, the battery pack comprising a plurality of battery modules therein;
    a guiding unit provided in the battery container, the guiding unit being configured to guide the battery pack between a loading/unloading position at which the battery pack is loaded onto and unloaded from the battery container and a containing position at which the battery pack is contained; and
    a guided unit provided in the battery pack, the guided unit being guided by the guiding unit,
    wherein a pair of rollers are provided in one of the guiding unit and the guided unit,
    a pair of engaging portions to be engaged with the rollers are provided in the other of the guiding unit and the guided unit, and
    when the battery pack is loaded and unloaded at the loading/unloading position, the rollers are configured to function as pivot fulcrums for enabling, by engaging with the engaging portions, the battery pack to pivot for loading and unloading relative to the battery container.

2. The electric work vehicle according to claim 1, wherein the rollers are provided in the guiding unit, and the engaging portions are provided in the guided unit,
    the guiding unit includes a pair of right and left guiding rails,
    the guided unit includes right and left guided rails that span both ends of the battery pack in a front-rear direction and are guided by the guiding rails,
    the engaging portions are arranged in lower faces of the guided rails on a front side thereof, and the rollers are configured to guide the lower faces of the guided rails toward a loading/unloading position side of the battery container,
    the guiding rails include lower guiding portions configured to guide the lower faces of the guided rails, and upper guiding portions configured to guide upper faces of the guided rails, and
    the guiding rails are arranged on a containing position side of the battery container, in a state of allowing the battery pack to pivot for loading and unloading.

3. The electric work vehicle according to claim 1, wherein the rollers are provided in the guiding unit, and the engaging portions are provided in the guided unit,
    the guided unit includes right and left guided rails that span both ends of the battery pack in a front-rear direction, and the engaging portions are steps formed in lower faces of the guided rails on a front side thereof,
    the guiding unit includes the rollers configured to guide the lower faces of the guided rails and a pair of second rollers configured to guide upper faces of the guided rails,
    the rollers are arranged on a loading/unloading position side of the battery container, and
    the second rollers are arranged in the battery container at a position on a containing position side relative to the roller, in a state of allowing the battery pack to pivot for loading and unloading.

4. The electric work vehicle according to claim 1, wherein the pivot fulcrums are located at or adjacent a centroid position of the battery pack when the battery pack pivots for loading and unloading.

5. The electric work vehicle according to claim 1, further comprising:
    a pair of right and left wheels arranged in a lower portion of the battery pack; and
    a handle arranged in a rear portion of the battery pack,
    wherein lower ends of the wheels are located below a bottom face of the battery pack, and rear ends of the wheels are located rearward of a rear face of the battery pack, and
    the handle extends upward from the rear portion of the battery pack with a top of the handle above the battery pack.

6. The electric work vehicle according to claim 1, further comprising:
    a handle arranged in a rear portion of the battery pack,
    wherein the handle includes a fixed portion fixed to the battery pack, and a movable portion capable of being displaced relative to the fixed portion,
    an upper end of the fixed portion is located at the same height or substantially the same height as an upper end of the battery pack, and
    the movable portion is supported by the fixed portion so as to be able to be displaced between a use position located above the fixed portion and a storage position located at substantially the same height as the fixed portion.

7. The electric work vehicle according to claim 1, wherein the battery pack includes a battery unit comprising the plurality of battery modules, a battery case in which the battery unit is contained, and a plurality of rubber cushions, and
the rubber cushions support the battery unit in a vibration-isolating manner between the battery case and the battery unit.

8. The electric work vehicle according to claim 7, wherein the plurality of rubber cushions include a plurality of first rubber cushions arranged between a bottom plate of the battery case and a bottom face of the battery unit, and a plurality of second rubber cushions arranged between a rear plate of the battery case and a rear face of the battery unit.

* * * * *